United States Patent
Kita et al.

(10) Patent No.: US 7,437,019 B2
(45) Date of Patent: Oct. 14, 2008

(54) APPARATUS AND METHOD FOR IMAGE PROCESSING, IMAGE PROCESSING PROGRAM AND RECORDING MEDIUM STORING THE IMAGE PROCESSING PROGRAM

(75) Inventors: Koji Kita, Wakayama (JP); Yasuhiro Yakawa, Wakayama (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 930 days.

(21) Appl. No.: 10/618,105

(22) Filed: Jul. 10, 2003

(65) Prior Publication Data

US 2004/0062451 A1    Apr. 1, 2004

(30) Foreign Application Priority Data

Jul. 18, 2002   (JP)   ............................ 2002-209527
Nov. 12, 2002  (JP)   ............................ 2002-328360

(51) Int. Cl.
  *G06K 9/32*   (2006.01)
(52) U.S. Cl. ..................... 382/296; 382/276
(58) Field of Classification Search ............... 382/154, 382/296, 302; 345/441, 634, 636; 715/508, 715/517
See application file for complete search history.

(56) References Cited

U.S. PATENT DOCUMENTS 5,493,639 A    2/1996   Hirano et al.
5,920,658 A *  7/1999   Yamagata et al. ........... 382/293

FOREIGN PATENT DOCUMENTS

| EP | 0 984 394 A | 3/2000 |
| JP | 2000-244724 | 9/2000 |
| JP | 2001-268338 | 9/2001 |
| JP | 2001-297238 | 10/2001 |
| JP | 2002-040565 | 6/2002 |
| WO | WO-00/00927 A | 1/2000 |

* cited by examiner

*Primary Examiner*—Duy M Dang
(74) *Attorney, Agent, or Firm*—Fulbright & Jaworski LLP

(57) ABSTRACT

An image processing apparatus has an image processing section for synthesizing image information in the form of digital signals and template information. The apparatus stores in advance the template information having a reference posture set to correspond to either a horizontal posture or a vertical posture of the image information. The vertical and horizontal postures have different vertical and horizontal sizes from each other. The template information thus stored is rotated by rotation processing section in accordance with the posture of the image information. During this rotation process, the template information is converted by a conversion processing section according to a predetermined rule.

6 Claims, 25 Drawing Sheets

FIG.9
200 template information generation
201 rotation and conversion processes
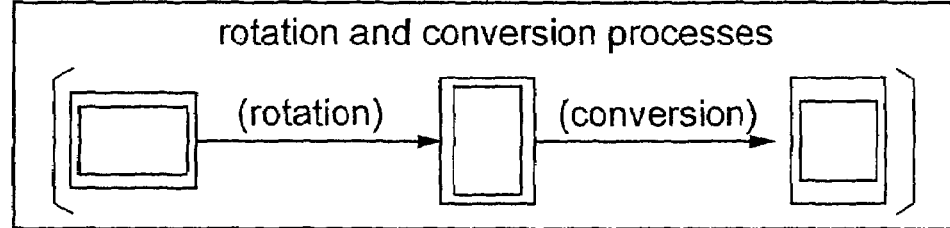
202 linked with character string information? → No
↓ Yes
203 rotation, conversions of display position and inter-charater distance
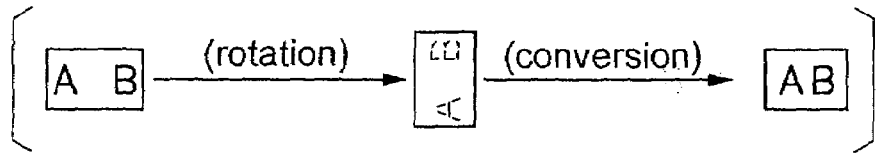
204 linked with graphic information? → No
↓ Yes
205 rotation, conversion of display position
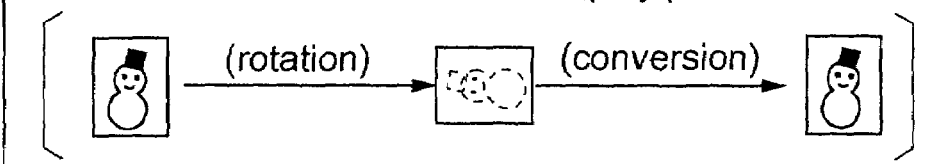
return

FIG.17
(a)
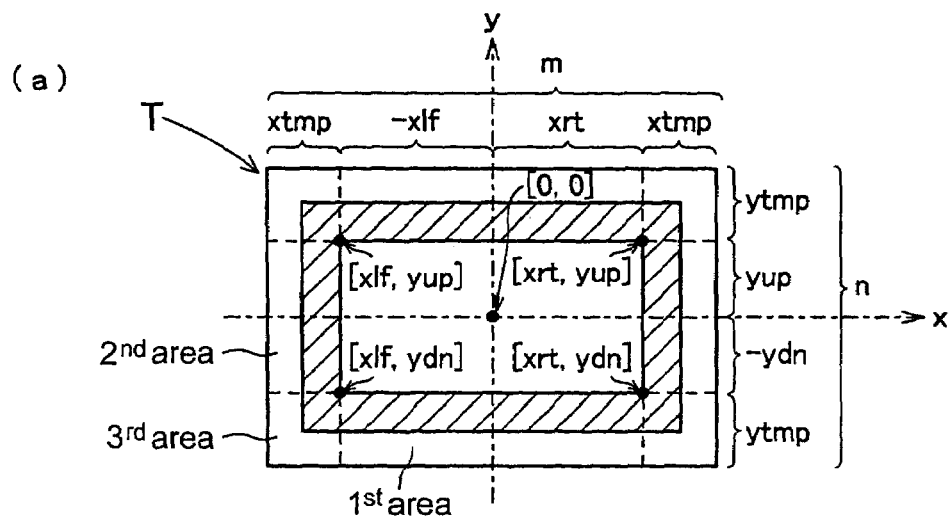
(b) enlargement/reduction of 1st area
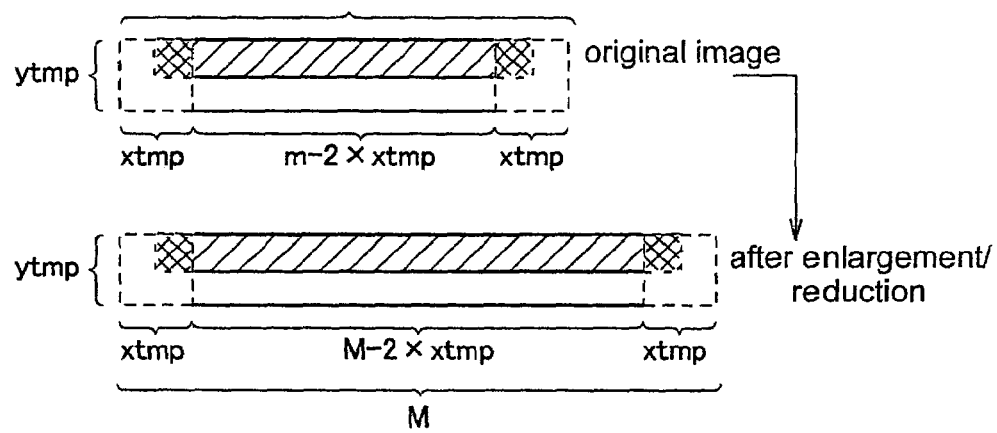
(c) enlargement/reduction of 2st area
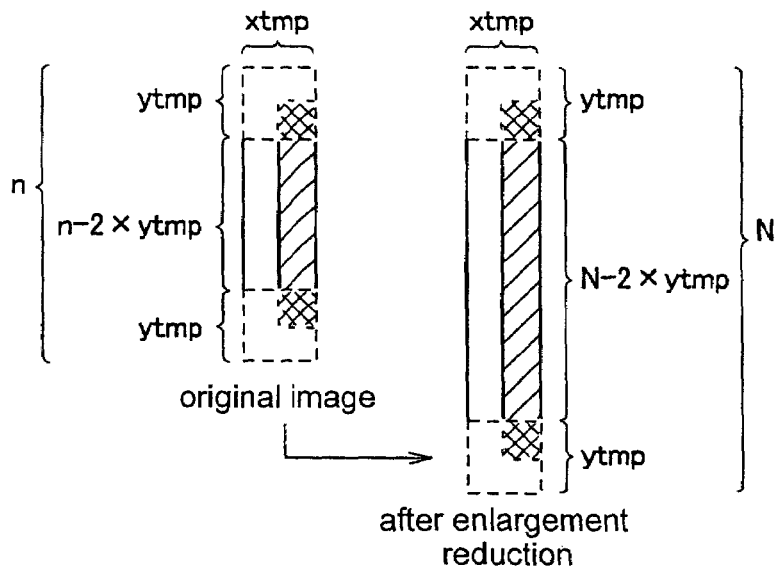

FIG.18
(a)
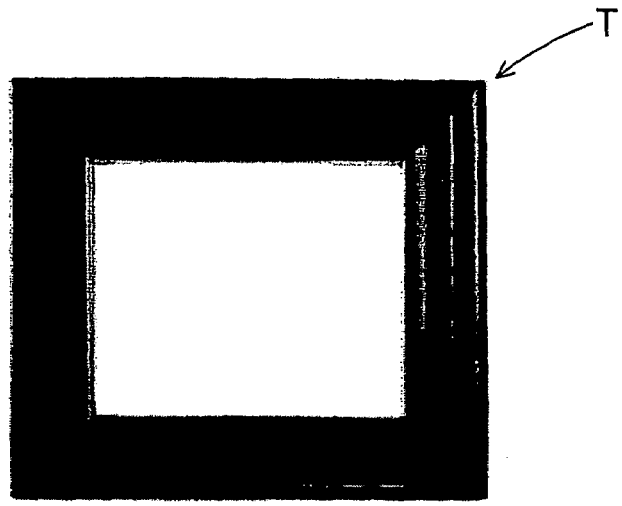
(b)
(c)

FIG.23
(a)
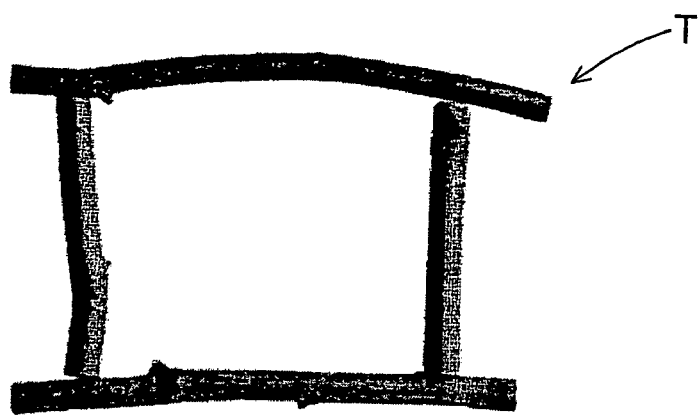
(b)
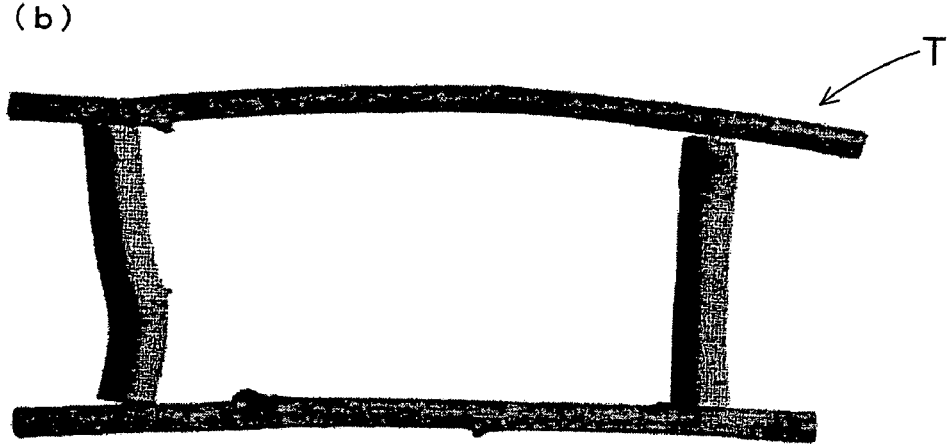
(c)
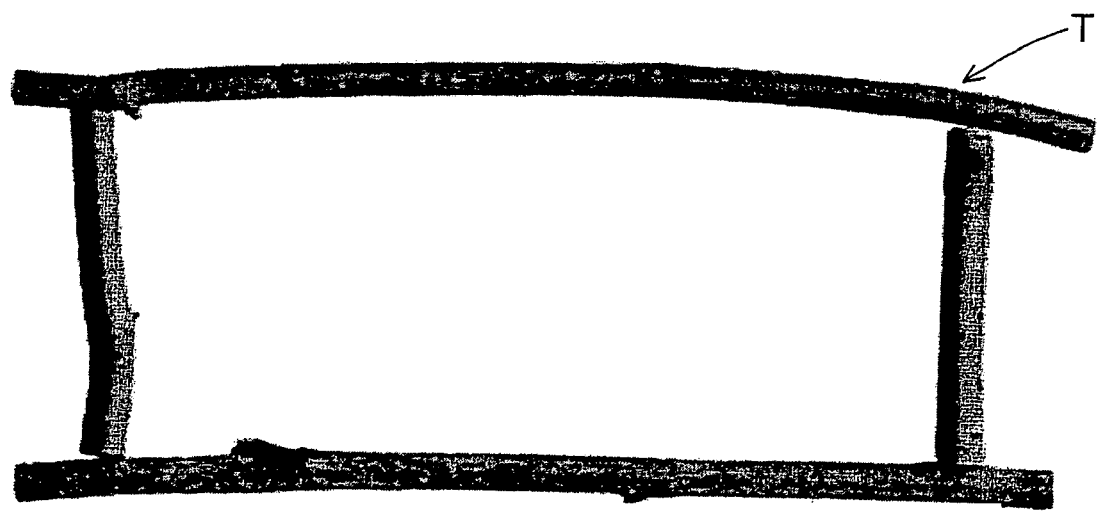

FIG.25
(a)
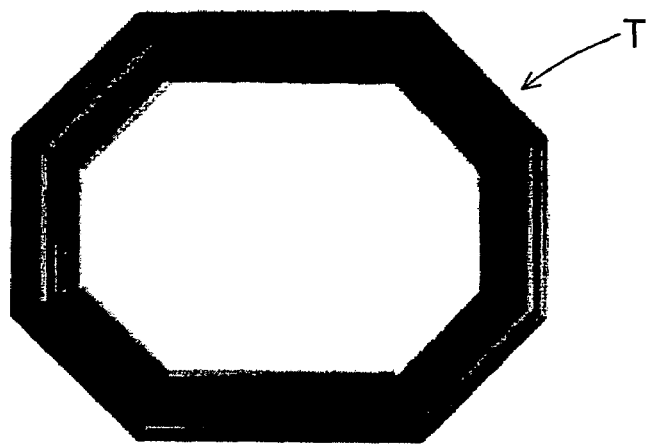
(b)
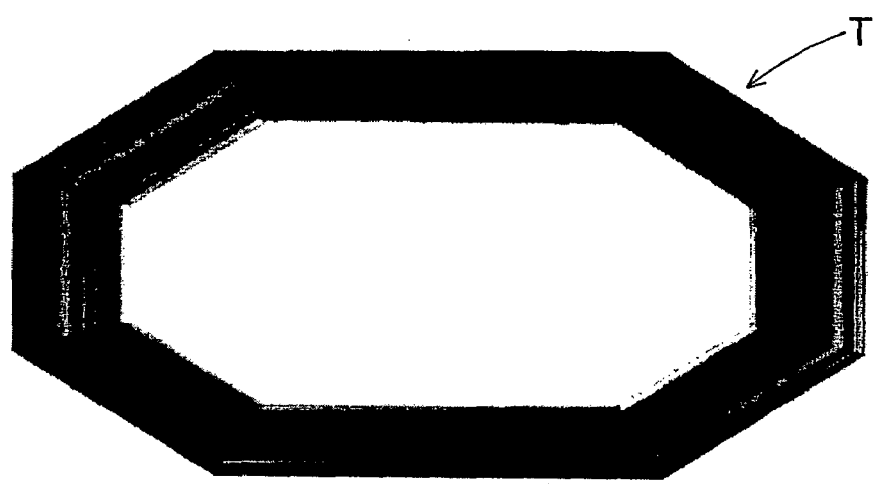
(c)
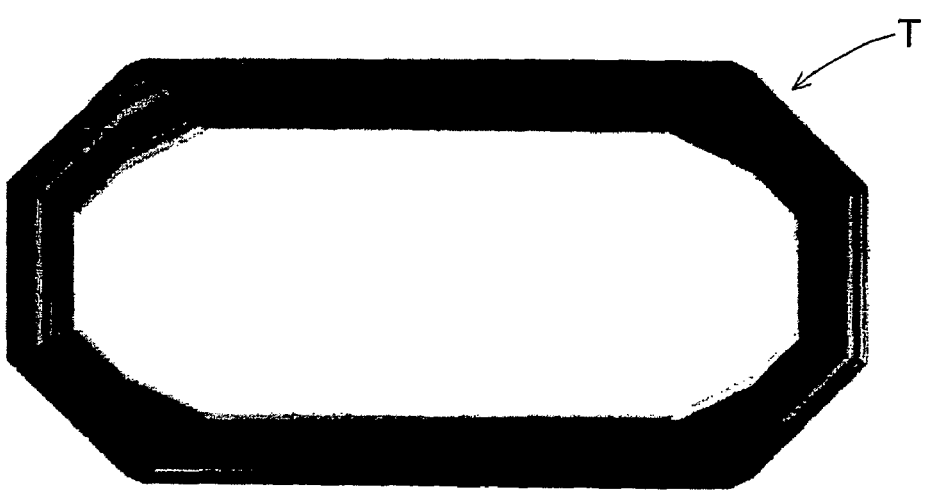

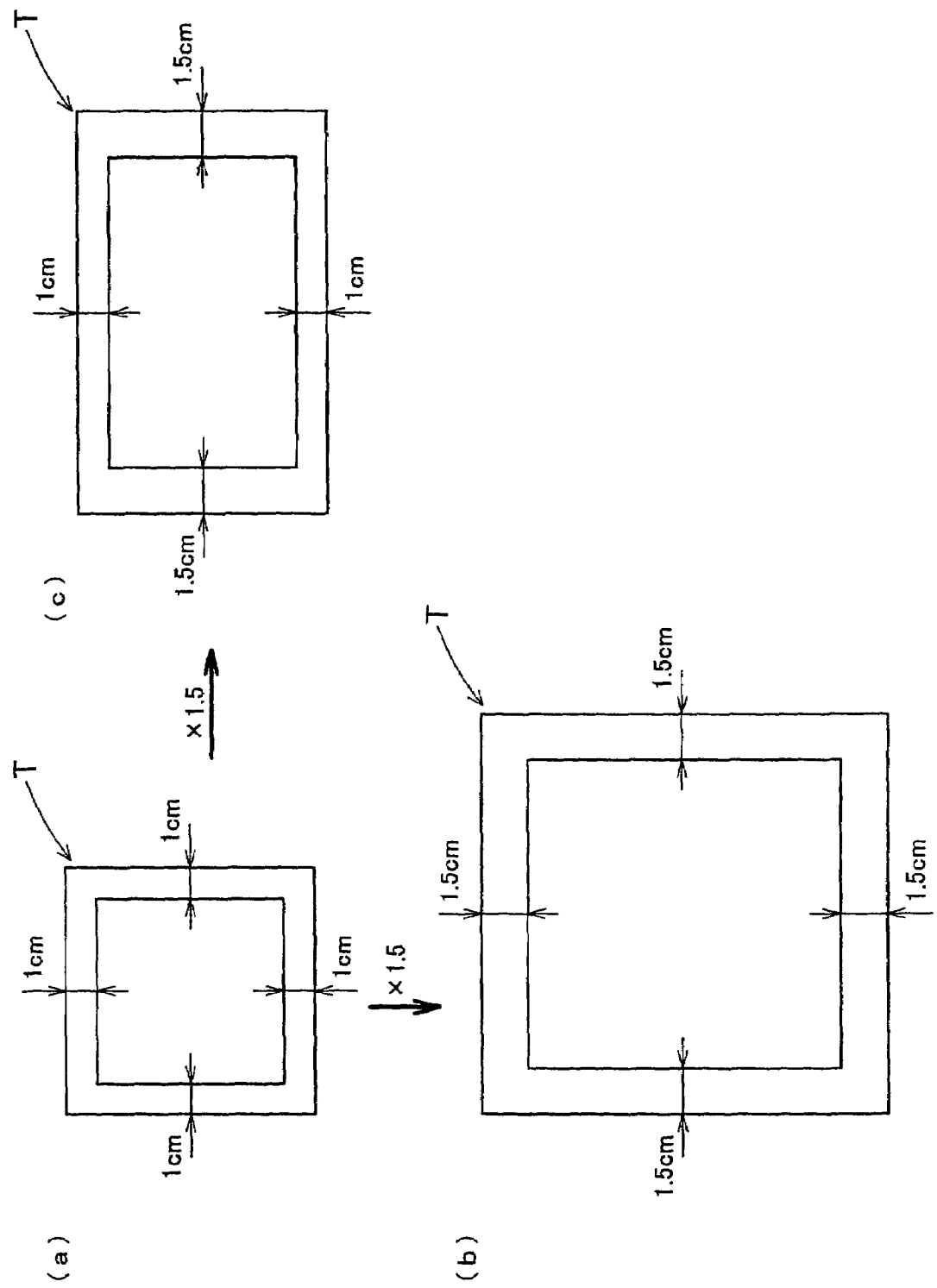

APPARATUS AND METHOD FOR IMAGE PROCESSING, IMAGE PROCESSING PROGRAM AND RECORDING MEDIUM STORING THE IMAGE PROCESSING PROGRAM

BACKGROUND OF THE INVENTION

1. Field of the Invention

The present invention relates to an apparatus including a synthesizing means for synthesizing image information in the form of digital signals and template information. The invention relates also to an image processing method for converting template information for forming a frame-like image, according to a predetermined rule, an image processing program and also to a recording medium storing the image processing program.

2. Description of the Related Art

An example of the image processing apparatus of the above-noted type is known from a Japanese Patent Application "Kokai" No. 2000-244724 (Prior Art 1). The contents of this publication will be described next.

This apparatus includes a display unit having a touch panel on a surface of an upper portion of the front face of the apparatus and a digital camera disposed inside a display screen provided at an upper portion of the display unit for photographing a user standing in front of the apparatus. On the front face of the display unit, there are provided a slot for an FD drive, a PC card slot, a memory card slot, etc The apparatus further includes a flat bed scanner disposed downwardly of the display unit, a coin slot disposed further downwards and a print discharge outlet formed at a lower portion of the front face of the apparatus.

According to this Prior Art 1, after template information is selected with a touch operation on the touch panel, a synthesizing operation is effected wherein image data obtained by the FD drive, the flat bed scanner or the digital camera is aligned with a synthesizing area of the template information to be superposed on the template information.

Another example of the image processing apparatus of the above-noted type is known from a Japanese Patent Application "Kokai" No. 2001-297238 (Prior Art 2). The contents of this publication will be described next.

This apparatus includes an order receiving unit in the form of a rectangular plate having a touch panel type liquid crystal display screen on the top face thereof and having also two openings for receiving removable media. Within this order receiving unit, there are provided a reading unit for reading image data of the removable media, a reading/writing unit for writing the image data and print order information in the removable media, a CPU for executing a program, an interface for outputting printing data to a printer, and a communication terminal for transmitting the order information to an image forming unit. The image forming unit includes a CRT disposed at an upper portion of the unit body, a film scanner unit, a reflection type document inputting unit and a control unit, so that the image data may be printed on a photosensitive material.

When a synthesizing operation is to be effected, a removable medium storing image data and a further removable medium storing template information are set to the order receiving unit, whereby a plurality of images as the image data and a plurality of template images as the template information are displayed are displayed in the form of an index on the liquid crystal display screen. Then, upon selection of a desired image data and a desired template image data based on the above display, the synthesizing operation is made possible for fitting the image data within a frame of the template image data. In this synthesizing operation, position adjustment, rotation, modification and size change of the image data within the template frame are also possible if desired. After this synthesizing operation, the synthesized image data can be printed by the image forming unit, in case the order receiving unit and the image forming unit are connected via LAN or the like. On the other hand, in case the order receiving unit is not connected to the image forming unit, the synthesized image may be stored once in a removable medium, so that the image data may be printed later when desired by the image forming unit.

In recent years, in the field of digital image processing, there has been increasing popularity in the market for a service for making an ornamental photographic print by superposing an inputted image of e.g. a human subject with a template image as a predetermined fixed image of a frame or a background landscape. An example of such service is making a postcard or a calender from a photograph brought to a service shop by a customer.

Examples of such template image are an image of a frame and a background landscape including an ornamental design or graphic cartoon character or the like therein. Examples of the technique for superposing such template image with the image information are known from the Japanese Patent Application "Kokai" No. 2000-244724 (Prior Art 1, supra), a Japanese Patent Application "Kokai" No. 2001-268338 (Prior Art 3), and a Japanese Patent Application No. 2002-40565 (Prior Art 4).

The Japanese Patent Application "Kokai" No. 2000-244724 (Prior Art 1) has been described above. Next, the contents of the Japanese Patent Application "Kokai" No. 2001-268338 (Prior Art 3) will be described.

An image synthesizing apparatus disclosed by this Prior Art 3 includes a synthesizing data memory for storing various kinds of information of shapes, ornamental patterns, colors and sizes and a photographic image memory for storing photographic image data inputted from a line CCD scanner. The apparatus further includes a synthesized data processing unit for generating a template image by combining the various kinds of information selected by an input unit comprising a keyboard and a mouse and a photographic image processing unit for effecting a well-known image processing on a photographic image selected by the input unit for generating a photographic image. During this processing, a reference template image in the form of a frame is shown on a display screen. This reference template image comprises a combination of peripheral corner images and peripheral side images. In operation, by locating a mouse pointer on each portion of this reference template image and then clicking the mouse, a selection input screen will be "popped out" on the display. Then, when a desired shape image is selected from the plurality of shape images shown in this selection input screen, the corresponding area in the reference template image will be replaced by the selected shape image information and then displayed again on the display screen. With selection of an ornamental pattern information and/or color information by similar procedure to the above, a template image may be made. Then, a synthesized image synthesized from the template image produced as above and the photographic image from the photographic image processing unit is shown on the display screen. After the operator confirms this synthesized image, the image may be printed.

Next, the contents of the Japanese Patent Application No. 2002-40565 (Prior Art 4) will be described.

The apparatus disclosed by this Prior Art 4 includes a processing unit for realizing synthesis of information inputted from a film scanner and an image inputted from a flat bed scanner. When this processing unit effects the synthesizing operation, the unit inputs a graphic illustration, an ornamental pattern or the like e.g. drawn by a customer on an order sheet via the flat bed scanner and inputs also image information of a photographic film via the film scanner. Then, the processing unit effects an image processing in which the unit makes distinction between a synthesizing area of the received image and an ornamental pattern area and superposes the ornamental area on the inputted photographic image, thereby to generate an image showing the inputted photographic image relative to the synthesizing area to be displayed on a monitor screen. If the operator determines this display is appropriate, its printing can be effected.

Now, as far as the synthesizing process of image information and template information is concerned, with either the above-described technique disclosed by Prior Art 1 or the technique disclosed by Prior Art 2, rotation, enlargement and reduction of the image information to be synthesized with the template information are possible. Hence, regardless of the composition of the image information whether it being horizontal or being vertical (image information obtained by the camera with its horizontal or vertical posture), and also regardless of the size of the image information whether it being slightly smaller or larger than that of the template information, the synthesis is still possible by either of the techniques.

One conceivable example of such template information described above allowing its synthesis with either the horizontal posture composition or the vertical posture composition photographic image information is a template image in the form of a frame encompassing the photographic image information. Considering the aesthetic visual balance of the synthesized image, however, it is not enough for the template information to be provided in the form of a frame for encompassing the image information within a fixed width thereof. It is desired that the template image should provide different variable widths for coping with the vertical and horizontal.

In order to meet such demand, it is conceivable to provide two kinds of template information corresponding respectively to the horizontal posture composition and the vertical posture composition. Further, regarding the kinds of the template information to be prepared, image information of a photograph of a happy event and image information of a memorial photograph should be significantly different in the color tones. Then, in order to cope with such variety of possibilities, a great variety of template information should be provided to suit different purposes. Even if the template information is provided in the form of a simple frame-like image, at least two kinds thereof will be needed for the horizontal posture composition and the vertical posture composition. All these requirements can invite disadvantageous enlargement of the capacity of the storage medium such as a hard disc for storing such great variety of template information.

Further, although the operation of rotating the template information in accordance with a particular composition of the photographic image information will be useful for restricting the amount of template information to be stored in the hard disc or the like, if this template information is to include a string of characters such as "birthday party", "school excursion", etc, then, e.g. 90 degree rotation of template information adapted for showing the string horizontally would result in inappropriate orientation of the character string. Hence, in this respect too, there remains room for improvement.

Considering the above from a different point of view, if the print size is fixed, it will be sufficient to prepare (store) a template image of a single size. Further, even if the print size is variable, as long as its aspect ratio remains fixed, the aspect ratio of the template image may be fixed as well. However, if the above-described shop service is to provide free selection of the print size or to provide change in the aspect ratio of the image (to e.g. so-called "panoramic size"), it become necessary to prepare all kinds of template images corresponding to the contemplated print sizes and aspect ratios. Obviously, storage of data concerning all possible sizes of template images will require a great memory capacity.

On the other hand, it is also possible to keep the size and aspect ratio of the template to be prepared (stored) constant. In this case, according to a desired print size or aspect ratio, an enlarging/reducing operation will be effected on the template image or the image comprising the template image and the inputted photographic image superposed with each other, thereby to change the size or aspect ratio of the template. In this case, the memory capacity required for storage of the template image data can be reduced.

However, such enlarging or reducing operation on the template information in the form of a frame results in not only the change in the vertical and horizontal dimensions of the template information, but also in the associated change (enlargement or reduction) in the widths of the sides of the template frame, thus resulting in unbalanced template shape. More particularly, as shown in FIG. 28(a), if frame-like template information adapted for providing a frame side width of 1 cm when outputted on e.g. a print paper is enlarged by 1.5 times in the vertical and horizontal directions, as shown in FIG. 28(b), the respective frame-side widths become 1.5 cm. Similarly, if the information is enlarged by 1.5 times in the horizontal direction, as shown in FIG. 28(c), the horizontal dimension of the horizontal frame is enlarged by 1.5 times and at the same time, the frame-side width of the vertical sides of this frame is enlarged by 1.5 times. In this way, the enlargement/reduction operation of the template information leads to disadvantageous change in the original template image as swell as the ornamental effect to be provided thereby. Therefore, in this respect too, there remains room for improvement.

SUMMARY OF THE INVENTION

In view of the above-described state of the art, a primary object of the present invention is to provide an improved image processing technique which allows appropriate synthesis of template information and image information whether it being horizontal or vertical, while retaining the advantage of reduction in the template information to be stored made possible the rotation technique of the template information and also appropriately maintaining the width of the sides of the frame constituting the template information.

For accomplishing the above-noted object, according to one aspect of the present invention, there is provided an image processing apparatus comprising: synthesizing means for synthesizing image information in the form of digital signals and template information; rotation processing means for effecting a rotation operation on the template information according to a posture of the image information which is either a vertical posture or a horizontal posture, the vertical and horizontal postures having different vertical and horizontal sizes from each other, the template information having a reference display posture corresponding to either said vertical or horizontal posture of the image information; and converting means for converting the template information according to a predetermined rule when said rotation processing means effects the rotation operation.

With the above-described feature, when the template information is to be synthesized with the image information of the different postures, the template operation is rotated and then converted according to the predetermined rule, whereby template information in the optimum form or posture can be produced and synthesized with the image information. As a result, the apparatus can store only one kind of template information of either the vertical posture or the horizontal posture, whereby the reduction of the information amount is made possible. Especially, by effecting the conversion operation, aesthetic visual imbalance may be avoided and the template information can be set at the optimum position.

Preferably, the template information comprises image data for forming, in said reference display posture, horizontal sides and vertical sides around the image information and said rule includes a numerical value representing a ratio so that the horizontal sides and the vertical sides of the template information after the rotation operation thereof are set to a predetermined width ratio.

With the above feature, when the template information in the reference display posture is rotated, the width ratio of the vertical sides and the horizontal sides constituting the template information is converted to the predetermined width ratio. For this reason, if e.g. the template information with the vertical sides and the horizontal sides differing in widths thereof in the reference display posture is rotated by 90 degrees, it is possible also to cause the ratio between the width of the vertical sides and the width of the horizontal sides of the rotated frame-like template information to agree with the ratio between the vertical sides and the horizontal sides of the frame-like template information in the reference display posture. As a result, both in the reference display posture and the rotated posture, the ornamental pattern of the template information may remain the same.

Preferably, the template information comprises character string data for displaying a leading character according to a predetermined reference coordinate system in the reference display posture; and said rule includes a parameter for converting a display position of the leading character into a value corresponding to a length of one side of the image information after the rotation operation and a parameter for setting an inter-character distance of the character string according to the length of said one side.

With this feature, when the template information in the reference display posture is rotated, the displayed position of the leading character of the character string constituting the template information can be set to the display position according to the length of one side of the image information and also the inter-character distance of the character string can be caused to correspond to the length of the one side of the image information. Therefore, for instance, let us suppose that the reference display posture of the template information is the horizontal posture, so that the character string constituting the template information is displayed along the horizontal direction under this reference display posture. Then, if this template information is rotated by 90 degrees in order to cope with the image information in the vertical posture, the rotation will not cause such inconvenience of a portion of the character string being displayed beyond the area of the image information. As a result, even when the template information includes a character string, it is possible to adapt this template information to either the vertical or horizontal posture, whereby the character string can be displayed at an optimum position.

Preferably, the template information comprise image data to be set within the image information based on predetermined locate information in the reference display posture; and said rule includes a parameter for converting the locate information so that the template information may be displayed at a predetermined position within the image information during the rotation operation.

With this feature, for instance, when a cartoon character image (graphic image) is to be displayed as the template information at a corner of the image, regardless of the posture of the image information, the character image may be displayed at a predetermined position at e.g. the right lower corner of the image. As a result, the template information can be always displaced at the best position for either vertical or horizontal posture image information.

Preferably, the image forming apparatus further comprises an edit processing means including an image layer for storing the image information and a template layer for storing the converted template information, the edit processing means being capable of freely adjusting positional relationship between the image layer and the template layer.

With this feature, after the rotation operation of the template information, the relative positional relationship between this template information and the image information can be adjusted by the edit processing means. As a result, the positional relationship between the template information and the image information can be set optimally.

For accomplishing the above-noted object, according to a further aspect of the invention, there is provided an image processing method comprising the steps of: synthesizing image information in the form of digital signals and template information; the method comprising the steps of: setting the template information to a reference display posture corresponding to either a vertical posture or a horizontal posture of the image information, the vertical and horizontal postures having different vertical and horizontal sizes from each other; rotating the template information according to the posture of the image information; and converting the template information according to a predetermined rule when said rotating step is effected.

With the above-described feature, when the stored template information in the reference posture is to be synthesized with image information of a different posture, the template information is rotated and the converted by the predetermined rule into new template information suited to the image information of that different posture. As a result, there is no need to prepare and store two kinds of template information for the vertical posture and the horizontal posture respectively, whereby the reduction of the information amount is made possible. Especially, by effecting the converting step, aesthetic visual imbalance may be avoided. and also the template information may be disposed at an optimum position.

For accomplishing the above-noted object, according to a still further aspect of the present invention, there is provided an image processing method for enlarging/reducing template information in the form of a frame-like image, the method comprising the steps of: dividing the template information into a plurality of frame segments information; enlarging/reducing at least one of the frame segments information obtained by the dividing step with maintaining a width of the frame segment; and generating new template information for forming a new frame-like image by using the enlarged/reduced frame segment information.

Normally, the frame-like image formed from the template information consists of a plurality of frame segments (frame sides). On the other hand, when the template information is to be enlarged or reduced, this enlarging/reducing operation is usually done by enlarging/reducing a size of the template information along a reference direction and/or a direction normal to the reference direction. In this case, there is no problem in longitudinal enlargement/reduction of the frame segments constituting the template information. However, since the enlargement/reduction occurs also in a direction different from the longitudinal direction of the frame segment (e.g. the direction normal to the longitudinal direction), this operation results in associated enlargement/reduction of the width of the frame segments. As a result, the original ornamental effect of the template information will be lost or at least compromised.

On the other hand, according to the above-described image processing method proposed by the present invention, the template information is divided into a plurality of frame segments information and at least one of these frame segments information is enlarged or reduced with maintaining the width of the frame segment (frame side width). As a result, even when the enlarging/reducing operation is effected on the template operation, the width of the frame segments of the template information may be maintained to the optimum value and this modified template information may be synthesized with the image information.

Preferably, in said step of dividing the template information, the template information is divided into a first area including a frame segment disposed parallel with the reference direction, a second area including a further frame segment disposed normal to the reference direction and a third area flanked between the first area and the second area, and said enlarging/reducing step is effected along the reference direction for the frame segment information included in the first area, said enlarging/reducing step is effected along the direction normal to the reference direction for the further frame segment information included in the second area and said enlarging/reducing step is not effected at all for the frame segment information included in the third area.

With the above feature, when the enlarging/reducing step is effected along the reference direction, this operation is effected for the frame segment information included in the first area, whereas the operation is not effected for the other frame segment information included in the second area or the third area. As a result, the enlarging/reducing operation can be carried out with maintaining the width of the frame segment information included in the first area. Consequently, with application of such simple rule involving the step of dividing the template information into the plurality of frame segments and the step of effecting the enlargement/reduction in accordance with each frame segment, the enlarging/reducing operation of the template information can be realized.

Preferably, the template information is adapted for forming a frame-like image in the rectangular or substantially rectangular form.

With this feature, in the either case of effecting the enlarging/reducing operation along the reference direction or effecting it along the direction normal thereto, the size of the template information can be changed without changing the width of the sides of the frame-like image. As a result, the template information for forming a rectangular or substantially rectangular frame-like image, the size of this information can be changed by the predetermined process.

Preferably, in the dividing step, within the frame-like mage formed by the template information, there is formed a first rectangle consisting of sides parallel to the reference direction and further sides normal to the reference direction, and the template information is divided into the plurality of frame segments information by cutting off the frame-like image by extensions obtained by extending the respective sides of said first rectangle.

With the above feature, within the frame-like mage formed by the template information, there is formed a first rectangle consisting of sides parallel (or substantially parallel) to the reference direction and further sides normal (or substantially normal) to the reference direction. Then, the frame-like image is cut off by the extensions of the respective sides of the first rectangle. Hence, the template information may be treated as a plurality of frame segments, on which the enlarging/reducing operation is to be effected. As a result, even if e.g. the original template information is of a complicated form, the objects to be subjected to the enlarging/reducing operation may be simple. Then, operation can be carried out appropriately by readily specifying the each object to be processed.

Preferably, said first rectangle has a plurality of the sides whose lengths are set so that the rectangle obtains a maximum area within the frame-like image.

With this feature, when the frame-like image is cut off by the extensions (extension lines) of the respective sides of the first rectangle, cutting or elimination of unnecessary portions of the image can be avoided. As a result, the enlarging/reducing operation can be carried out appropriately with effective distinction of the target object enabled by the simple process.

Preferably, the template information is adapted for forming a projection projecting into the frame-like image, and said first rectangle is formed at a position not separating said projection from a frame portion including this projection.

With the above feature, when the first rectangle is formed, the projection can be included in the objects on which the enlarging/reducing operation is to be effected. Therefore, it becomes possible to avoid the inconvenience of the projection and the frame portion including this projection being enlarged or reduced in different directions from each other. As a result, by avoiding unnecessary enlargement/reduction of the projection, the template information can be maintained at the desired shape.

Preferably, said predetermined rule is set so that the enlarging/reducing step is effected on either one of the first and second areas.

With this feature, by effecting e.g. an enlarging/reducing operation on a frame segment included in the first area, the aspect ratio of the template information may be changed conveniently, thereby to improve the balance of the width of the frame of the template information.

Preferably, the template information is adapted for forming a non-rectangular frame image and in the dividing step, within the non-rectangular frame-like mage formed by the template information, there is formed a second rectangle consisting of sides parallel to the reference direction and further sides normal to the reference direction, and the template information is divided into the plurality of frame segments information by cutting off the frame-like image by extensions obtained by extending the respective sides of said second rectangle.

With the above-described feature, even if the frame has a special shape such as a circular, oval or hexagonal shape, it is possible to determine which of the first area and the second area each side constituting the template information belongs in with by using the second rectangle as a reference. As a result, the enlarging/reducing operation may be simplified.

Preferably, said reference direction is set normal to a transporting direction of a print paper to which the frame-like image based on the template information is outputted.

With the above feature, the image information can be outputted by using the fixed direction of the print paper as the reference direction. Consequently, the print paper can be discharged with a fixed posture thereof.

For accomplishing the above-noted object, according to a still further aspect of the invention, there is provided an image processing program executable by a computer for effecting an enlarging/reducing operation on template information for forming a frame-like image, the operation including the steps of: dividing the template information into a plurality of frame segments information; enlarging/reducing at least one of the frame segments information obtained by the dividing step with maintaining a width of the frame segment; and generating new template information for forming a new frame-like image by using the enlarged/reduced frame segment information.

With the above-described feature, when this image processing program is executed by a computer, the enlarging/reducing operation can be carried out with maintaining the width of the frame segment by simply setting an enlarged or reduced size for the template information. Consequently, template information of a required size can be obtained only by executing the program by a computer.

For accomplishing the above-noted object, according to a still further aspect of the present invention, there is provided a recording medium storing an image processing program executable by a computer for effecting an enlarging/reducing operation on template information for forming a frame-like image, the operation including the steps of: dividing the template information into a plurality of frame segments information; enlarging/reducing at least one of the frame segments information obtained by the dividing step with maintaining a width of the frame segment; and generating new template information for forming a new frame-like image by using the enlarged/reduced frame segment information.

With the above-described feature, by executing the program stored in the recording medium by means of a computer and desirably setting the enlarged or reduced size of the template information, the enlarging/reducing operation can be carried out with maintaining the width of the frame segment by simply setting an enlarged or reduced size for the template information. Consequently, template information of a required size can be obtained only by executing the program by a computer.

Further and other features and advantages of the invention will become apparent upon reading the following detailed disclosure of preferred embodiments thereof with reference to the accompanying drawings.

BRIEF DESCRIPTION OF THE DRAWINGS

FIG. 9 is a flowchart illustrating a processing routine for generating the template information relating to the first embodiment, FIG. 17 shows an original image prior to an enlarging/reducing operation, an enlarged/reduced image and illustrates an enlarging/reducing operation of a first area of the original image and an enlarging/reducing operation on a second area of the original image, all relating to the second embodiment, FIG. 18 shows images relating to the second embodiment including an original image of template information, an enlarged image enlarged by the conventional method and an enlarged image enlarged by the invention's method, FIG. 23 shows images relating to the Variation 1 of the second embodiment including an original image of template information, an enlarged image enlarged by the conventional method and an enlarged image enlarged by the invention's method, FIG. 24 sequentially illustrates a mode of process relating to a Variation 2 of the second embodiment wherein a first area, a second area and a third area are set and then an enlarging operation is effected, FIG. 25 shows images relating to the Variation 2 of the second embodiment including an original image of template information, an enlarged image enlarged by the conventional method and an enlarged image enlarged by the invention's method, FIG. 28 shows views including an original image prior to an enlarging/reducing operation, an enlarged image obtained by enlarging the original in the vertical and horizontal directions and an enlarged image obtained by enlarging the original image in the horizontal direction.

DESCRIPTION OF THE PREFERRED EMBODIMENTS

First Embodiment

Preferred embodiments of the invention will be described next with reference to the accompanying drawings.

Figure 1:
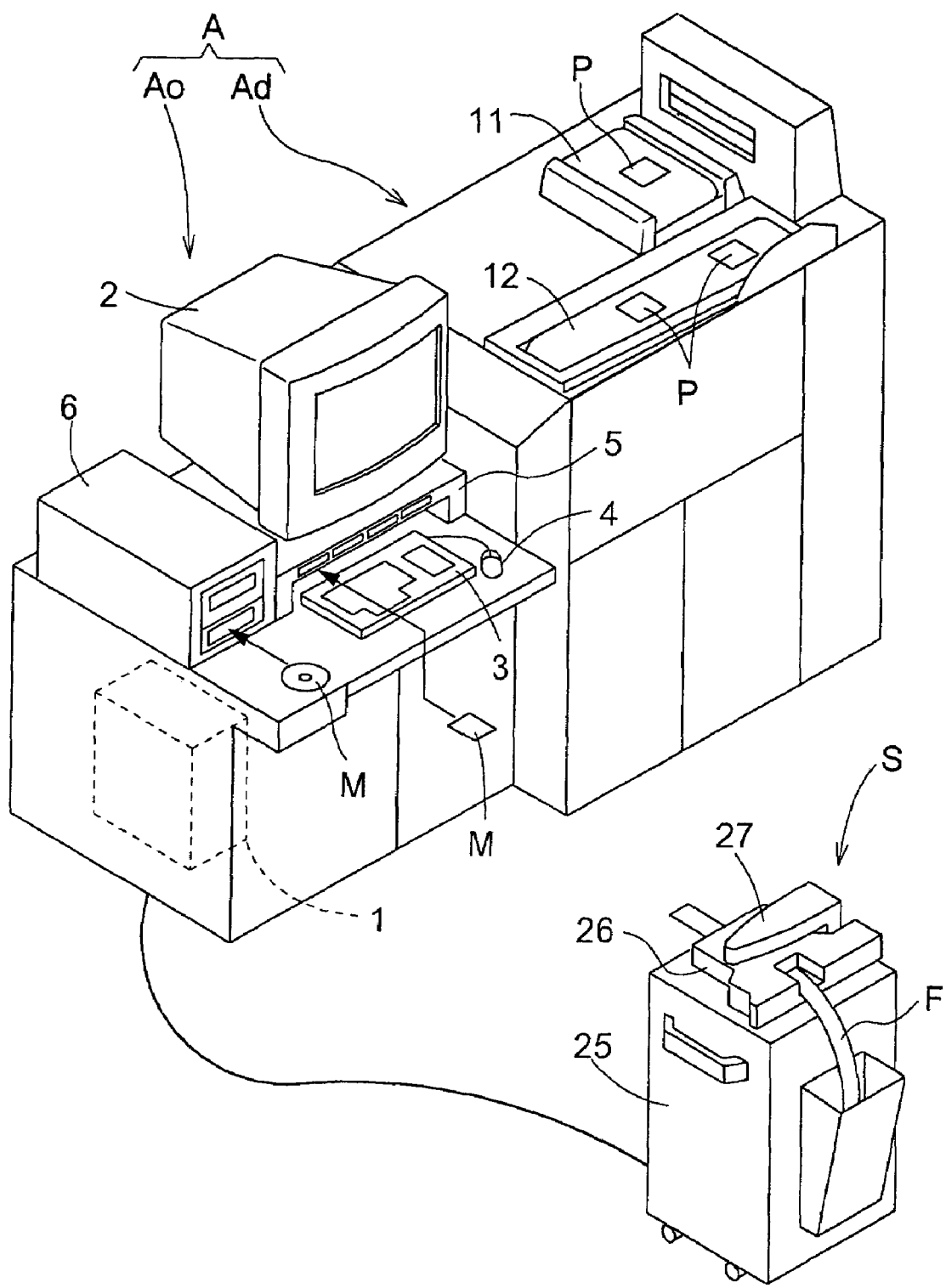
FIG. 1 is an overall perspective view showing an image processing apparatus relating to a first embodiment of the invention.

As shown in FIG. 1, a photographic printing system includes a system body A which is provided as an integrated assembly consisting of an operation console Ao in the form of a table and a developing unit Ad, and a scanner unit S provided separately from the system body A.

The operation console Ao includes a controller 1 acting as an image processing apparatus, a display 2 for displaying various kinds of information, a keyboard 3, a mouse 4, a plurality of semiconductor drives 5 provided in correspondence with various types of semiconductor type storage media M, and a plurality of disc drives 6 for reading information from magnetic or optical storage media M.

Figure 2:
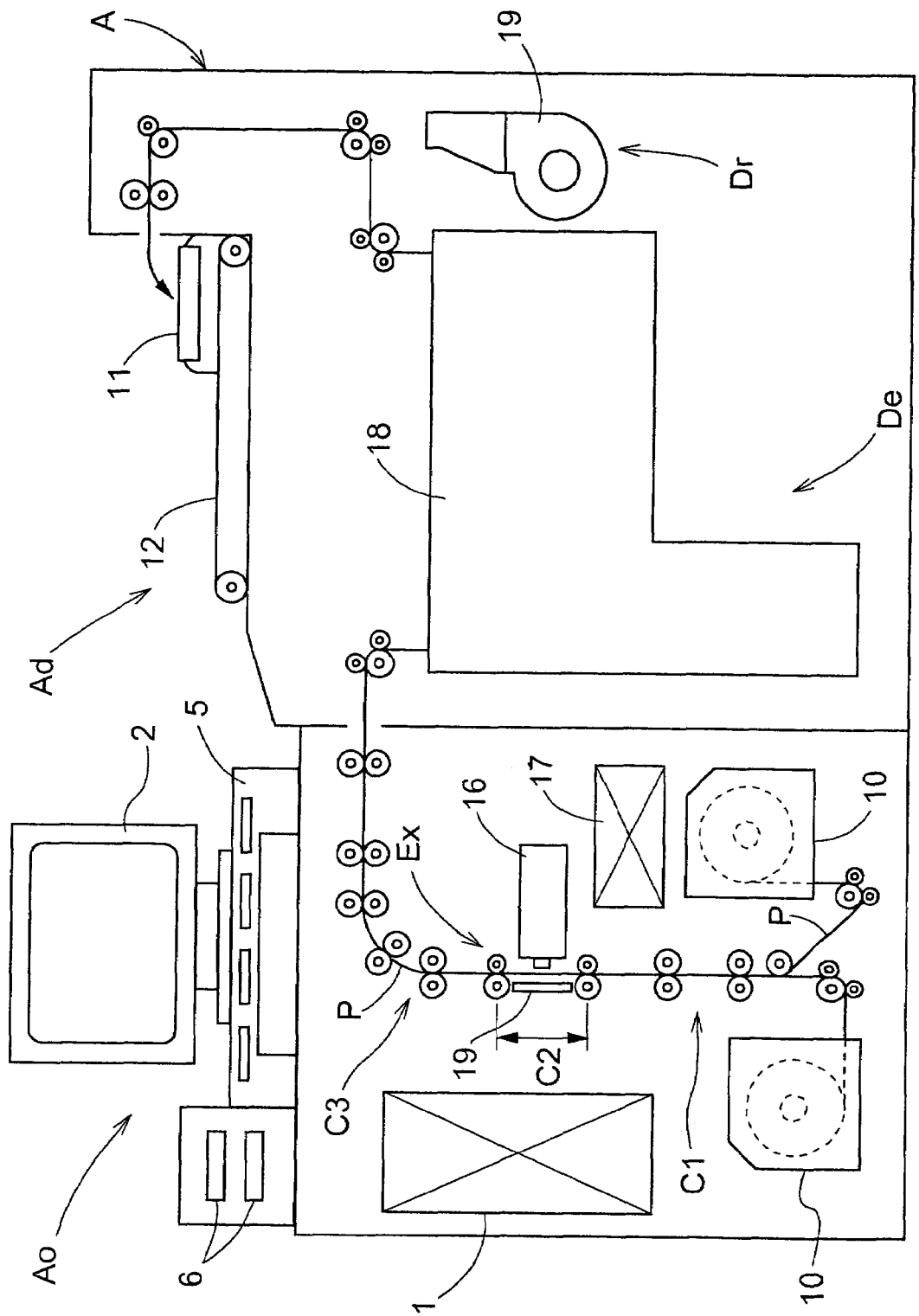
FIG. 2 is a section view showing a developing unit relating to the first embodiment.

The developing unit Ad, as shown in FIG. 1 and FIG. 2, accommodates therein an exposing section Ex for exposing image information on an elongate print paper of the silver salt type stored in a rolled state within a pair of print paper magazines 10, a developing section De for developing the print paper P exposed at the exposing section Ex, and a drying section Dr for drying the print paper P developed at the developing section De. Further, the developing unit Ad includes, on the top face of the system body A, a horizontal conveyer 11 for horizontally conveying the print paper P discharged from the drying section Dr onto the top face of the system body, and a sorter conveyer 12 for sorting the print paper P from the horizontal conveyer 11 and conveying it to the operation console Ao.

The exposing section Ex includes a forward transporting mechanism C1 having a plurality of clamping rollers for feeding the print paper P from the print paper magazine 10, an exposing transporting mechanism C2 having a plurality of clamping rollers for transporting the print paper P from the forward transporting roller C1 through an exposing position, a rear transporting mechanism C3 having a plurality of clamping rollers for transporting the print paper P from the exposing position to the developing section, and an exposing unit 16 for exposing a photosensitive face of the print paper P transported by the exposing transporting mechanism C2 and forming a latent image of image information thereon.

The forward transporting mechanism C1, the exposing transporting mechanism C2 and the rear transporting mechanism C3 can be driven by drives of independently provided synchronous electric motors. And, an exposing section controller 17 for controlling these electric motors and the exposing unit 16 is provided within the system body A. The exposing unit 16 operates to expose the print paper P by irradiating and scanning laser beams from R (red), G (green) and B (blue) laser sources on the print paper P.

The developing section De includes a plurality of developing processing tanks and a developing unit 18 having a plurality of clamping rollers for continuously transporting the print paper P to the respective developing processing tanks.

The drying section Dr includes a plurality of clamping rollers for transporting the print paper P and a blower 19 for feeding heated dry air current to the print paper P being transported by the clamping rollers.

The scanner unit S includes a film carrier 26 interchangeably provided on the top face of a housing 25 having casters on the bottom thereof and a beam irradiating system for guiding beam from a beam source, e.g. a halogen lamp, housed in the housing 25 via optical fibers (not shown) to an end of an arm 27 disposed upwardly of the film carrier 26. Further, inside the housing 25, there is provided a photoelectric converter (not shown) for guiding the beam transmitted through a developed photographic film supported on the film carrier 26 from an optical lens to photoelectric converting elements such as CCD and then converting the image information of this photographic film F into digital signals.

With this scanner unit S in operation, a developed negative or positive photographic film F is set to the film carrier 26. Then, the beam from the beam source is irradiated on the film. As the film F is being transported at a predetermined speed by the film carrier 26, frame image information of the photographic film F is color-separated into the three primary color components of R (red), G (green) and B (blue) and converted into the digital signals at the photoelectric converter. Then, these digital signals are transmitted to the controller 1.

This image information obtained at the scanner unit S or image information obtained by the semiconductor drives 5 or the disc drives 6 will be used as "image information G" (see FIG. 5) to be printed on the print paper P.

Though not shown, it is also conceivable to pick up the image information by means of a reflection type scanner unit. Further, the image information obtained by the semiconductor drives 5 or the disc drives 6 can be image information obtained by a digital camera or image information obtained by a film scanner from a photographic film.

Figure 3:
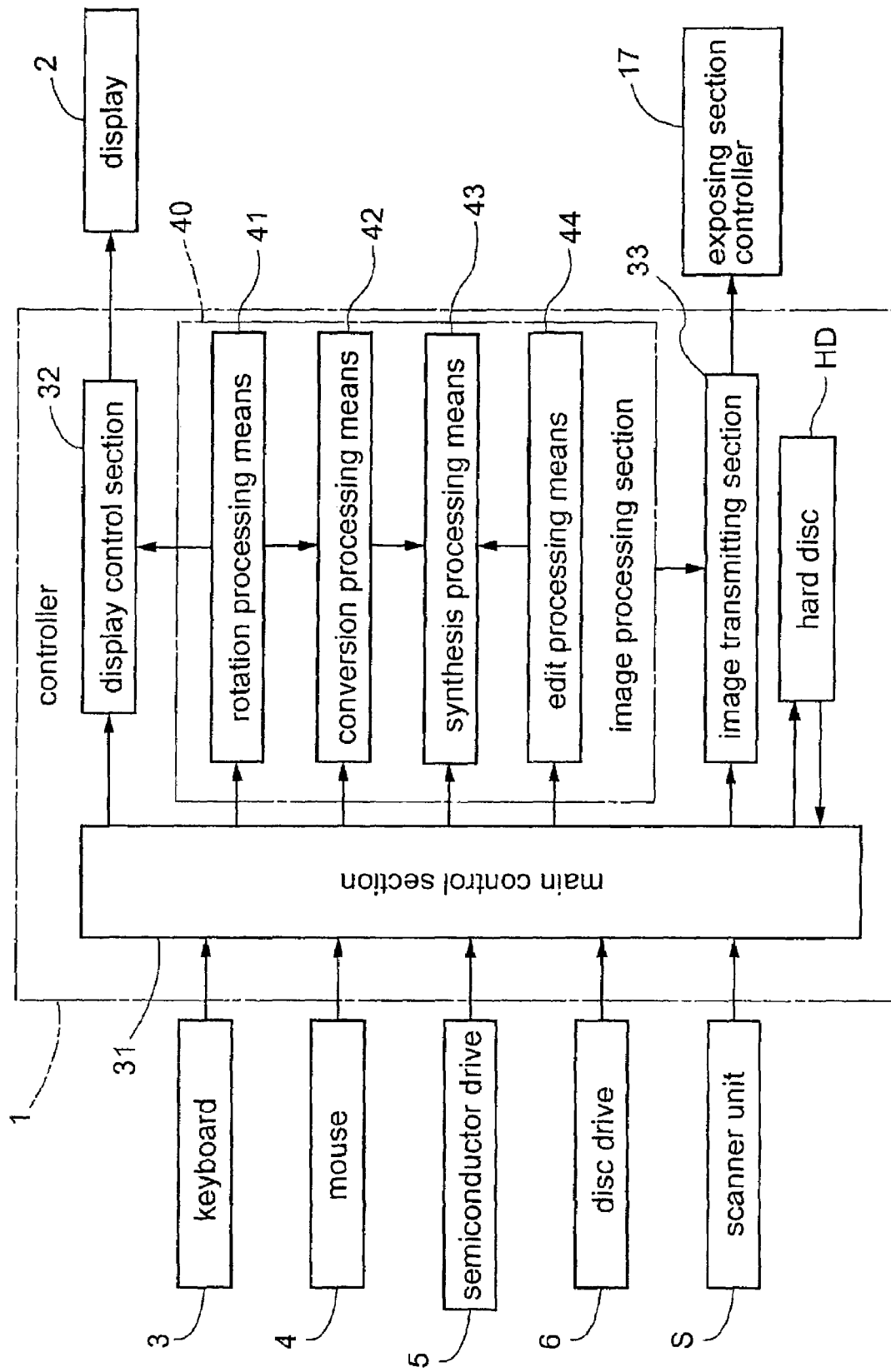
FIG. 3 is a circuit block diagram of a control unit relating to the first embodiment.

As shown in FIG. 3, the controller 1 includes a main control section 31 having a microprocessor, a semiconductor memory, an I/O interface, etc. and including an input system for inputting the signals from the keyboard 3, the mouse 4, the semiconductor drives 5, the disc drives 6 and the scanner unit S, a display control section 32 for outputting the image information G to the display 2, an image processing section 40 for effecting a correction operation of the image information G to be printed and also a synthesizing operation of the image information G with template information T (see FIG. 5) as will be described later, an image transmitting section 33 for transmitting the image information G to be printed to the exposing section controller 17, and a hard disc HD as a storage device for storing information. In this hard disc HD, there are installed a basic OS (operating system) for realizing access to information and processing of the image information G and a software for realizing a printing operation and a synthesizing operation to be described later.

As also shown in FIG. 3, the image processing section 40 includes rotation processing means 41 for effecting a rotation processing of the template information T, conversion processing means 42 for converting the template information T according to a predetermined conversion rule, a synthesis processing means 43 for effecting synthesis of the image information G with the template information T, and an edit processing means 44 for adjusting, after the synthesis process, a relative positional relationship between an image layer LG mapping the image information G and a template layer LT mapping the template information T.

Each of the rotation processing means 41, the conversion processing means 42, the synthesis processing means 43 and the edit processing means 44 can be provided as a hardware or software or a combination of hardware and software.

Figure 4:
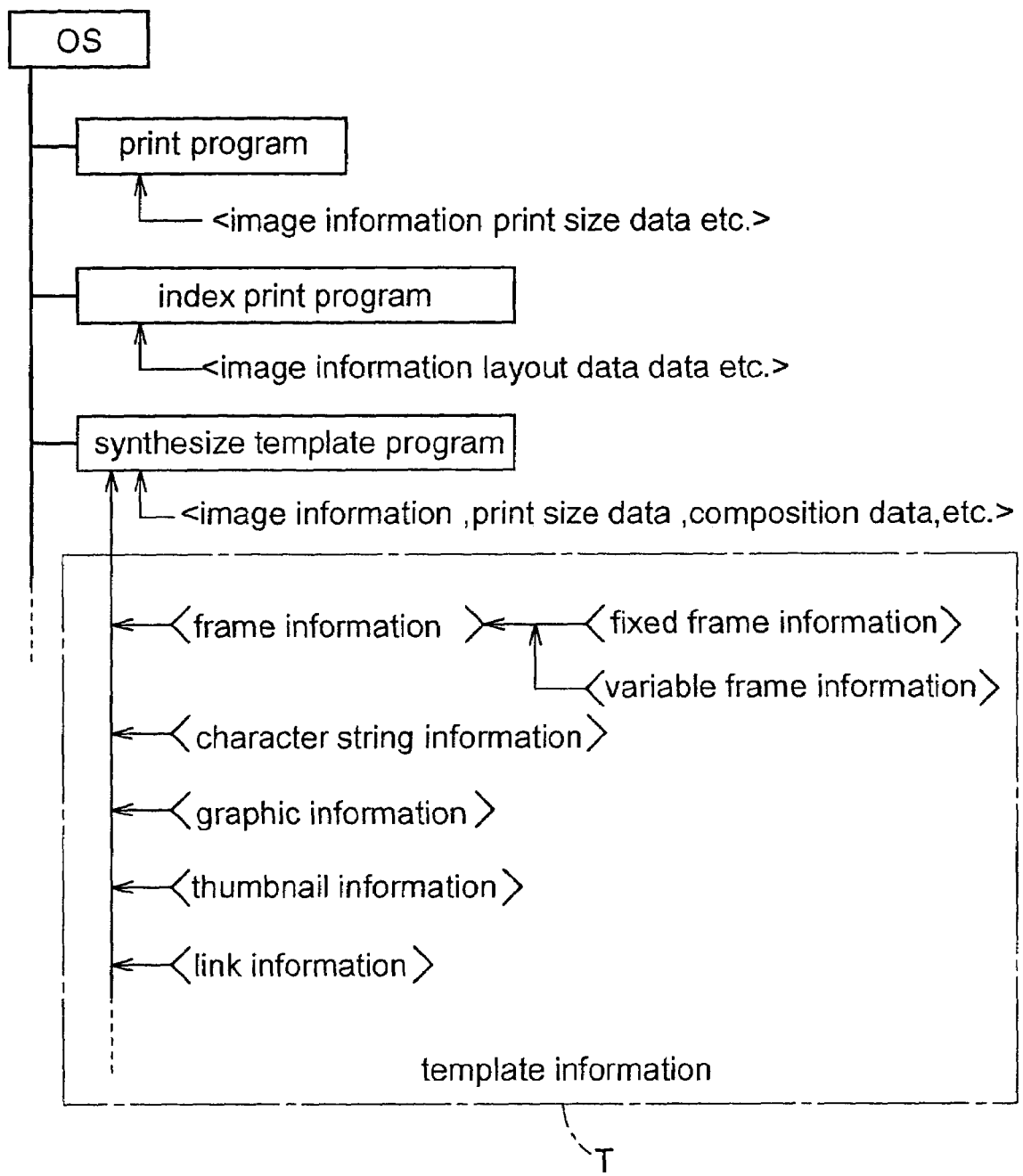
FIG. 4 is a schematic showing relationship between a program and data relating to the first embodiment.

The controller 1 is adapted for providing a printing mode for printing one frame amount of image information G on a single print paper P, an index printing mode for printing a plurality of frames of image information G on a single print paper P, and a template synthesizing mode for printing the image information G together with the predetermined template information T along the outer peripheral area of the image information on the print paper P. The program required for realizing this process and information needed at the time of execution of the program can be schematically illustrated as shown in FIG. 4.

The template information T includes three kinds of information, namely, frame information for forming a frame-like image around the image information G, character string information for forming a character string along the periphery of the image information G, and a graphic information for forming a graphic image such as of a cartoon character or a logo at a portion along the periphery of the image information G. The image processing section 40 is capable also of a printing two or more kinds of the three kinds of template information T in an overlapped manner. Incidentally, in the case of this printing where two or more kinds of template information T are printed in an overlapped manner, link information (see FIG. 4) for linking these kinds of information is generated.

The frame information includes fixed frame information comprising image data based on an image having a fixed posture, such as an image of animal, plant or landscape, and variable frame information comprising image data based on an image not having such fixed posture, such as an image of a simple frame. More particularly, the fixed frame information consists of two kinds of information, one adapted for a horizontal posture composition of the image information G and the other adapted for a vertical posture composition of the image information G. And, these two kinds of fixed image information are stored in the hard disc HD in advance. Also, the variable frame information stored also in the hard disc HD has a reference display posture corresponding to the horizontal posture composition of the image information G. However, this reference display posture can also correspond to the vertical posture composition, instead of the horizontal posture composition.

Then, when the fixed frame information T is to be synthesized with the image information G, if this image information G has a horizontal posture composition, the one kind of fixed image information adapted for the horizontal posture composition is read from the hard disc HD and then superposed with the image information G to be synthesized therewith. On the other hand, if the image information G has a vertical posture composition, the other kind of fixed image information adapted for the vertical posture composition is read from the hard disc HD and then superposed and synthesized therewith.

As to the variable frame information, if the image information G to be synthesized has the horizontal posture composition, the variable frame information having the reference display posture is read from the hard disc HD to be synthesized therewith. On the other hand, if the image information G to be synthesized has the vertical posture composition, after the variable frame information is read from the hard disc HD, this information is subjected to a rotation operation for rotating it by 90 degrees and a conversion operation for converting the width of the sides of the frame according to a predetermined conversion rule and then this information is synthesized with the image information G.

Referring to the character string information, like the variable frame information described above, the hard disc HD stores this character string information with its reference display posture set to correspond to the horizontal posture composition. And, when this character string information is to be synthesized with the image information G, if this image information G has the horizontal posture composition, the character string information is read from the hard disc HD to be superposed and synthesized therewith. Incidentally, even when the image information G to be synthesized has the horizontal posture composition, if its vertical orientation is reversed, the character string information is subjected to a rotation operation for rotating it by 180 degrees.

Further, if the image information G has the vertical posture, after the character string information is read from the hard disc HD, this character string information is subjected to a rotation operation for rotating it by 90 degrees or 270 degrees and also to a conversion operation for converting the character string according to the predetermined conversion rule and then this processed and conversed character string information is superposed and synthesized with the image information G. Incidentally, even when the image information G to be synthesized has the vertical posture composition, if its vertical orientation is reversed, depending on the vertical orientation thereof, either the rotation angle of 90 degrees or the angle of 270 degrees is selected.

Like the variable frame information described above, the hard disc HD stores the graphic information with its reference display posture set to correspond to the horizontal posture composition. And, when this graphic information is to be synthesized with the image information G, if this image information G has the horizontal posture composition, the graphic information is read from the hard disc HD to be superposed and synthesized therewith. Incidentally, even when the image information G to be synthesized has the horizontal posture composition, if its vertical orientation is reversed, the character string information is subjected to a rotation operation for rotating it by 180 degrees.

Further, if the image information G has the vertical posture, after the graphic is read from the hard disc HD, this graphic information is subjected to a rotation operation for rotating it by 90 degrees or 270 degrees and also to a conversion operation for converting the graphic information according to the predetermined conversion rule and then this processed and conversed graphic information is superposed and synthesized with the image information G. Incidentally, even when the image information G to be synthesized has the vertical posture composition, if its vertical orientation is reversed, depending on the vertical orientation thereof, either the rotation angle of 90 degrees or the angle of 270 degrees is selected.

That is, as shown in FIG. 4, the program to be executed by the OS (the basic program installed in the controller 1) includes a printing program for effecting the process in the printing mode, an index printing program for effecting the process in the index printing mode and a template synthesizing program for effecting the process in the template synthesizing mode.

Namely, the printing program effects an operation for printing the image information G on the print paper P based on e.g. print size data. The index printing program effects an operation for printing a plurality of frames of image information G on the single print paper P based on e.g. layout data. The template synthesizing program effects a printing operation for printing the image information G and the template information T on the print paper P based on the print size data, composition data, the template information T and the image information G.

More particularly, as the frame information, as described hereinbefore, the hard disc HD stores therein a plurality of kinds of fixed frame information corresponding to the plurality of types of image information G, the variable frame information, the character string information and the graphic information.

The template information T consists of the frame information, the character string information, thumbnail information and the link information. Further, the frame information consists of the fixed frame information and the variable frame information. All of these are stored in advance in the hard disc HD. Further, the thumbnail information comprises small-sized image data based on and reduced in the data amount relative to the frame information (fixed frame information and variable frame information) and the graphic information. The link information comprises information to be used for specifying corresponding information when at least one of the frame information, the character string information and the graphic information is to be synthesized with the image information G.

Incidentally, each of these kinds of information, i.e. the fixed frame information, the variable frame information, the character string information, the graphic information and the thumbnail information can be non-compressed information or compressed information.

The variable frame information includes the image information of the reference display posture and data describing the rule used for the conversion. And, this variable frame information is stored in a folder having index information for discriminating the variable frame information. Also, the conversion rule can be a file describing the conversion rule in the text format. Instead, this can include a conversion program for effecting the process according to the conversion rule. The thumbnail information includes two kinds of information, one adapted for the reference display posture and the other adapted for the vertical posture composition of the image information G.

Figure 5:
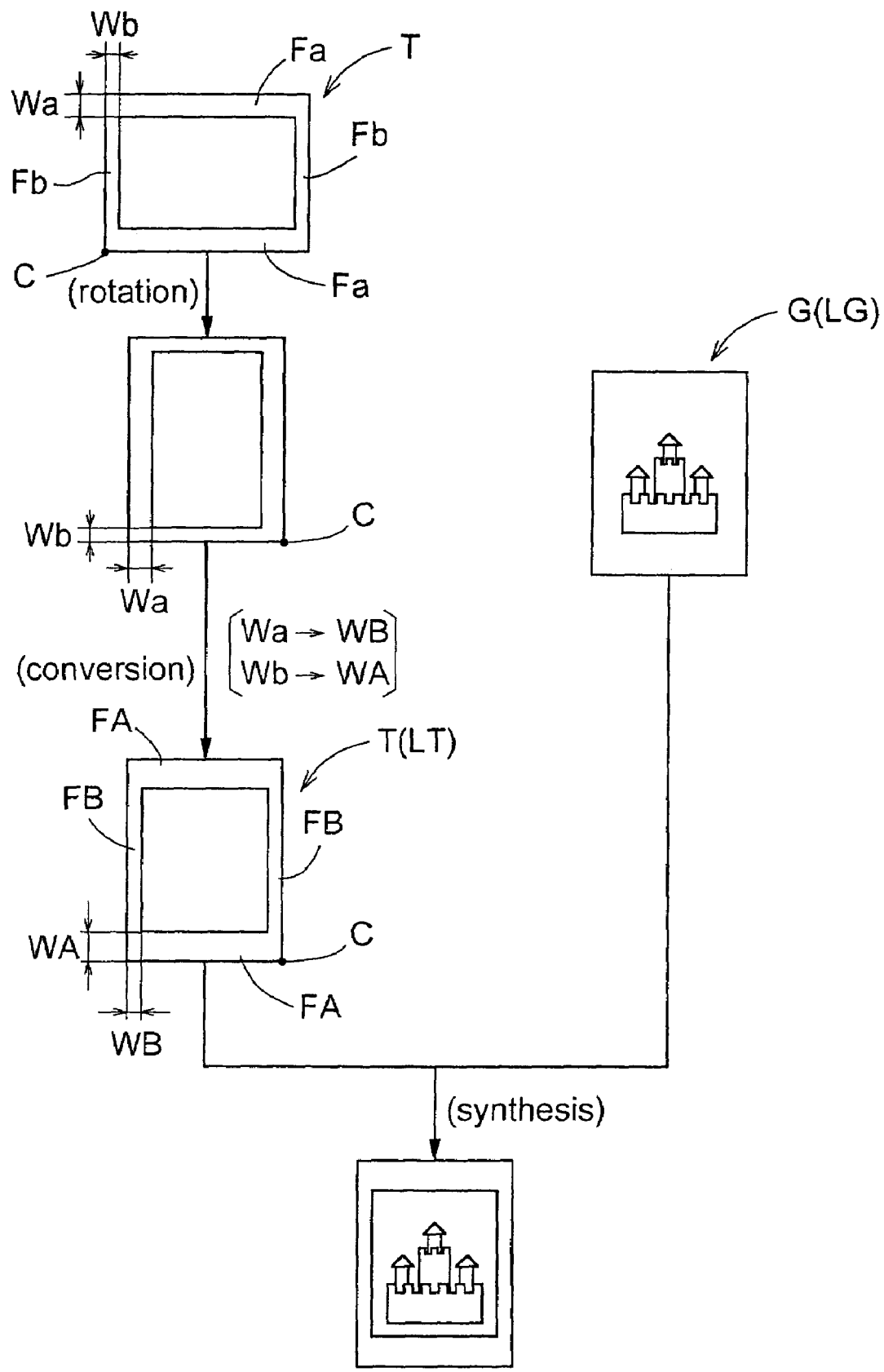
FIG. 5 is a schematic showing process of a synthesizing operation of template information and image information relating to the first embodiment.

Next, an example of mode of the process for rotating the variable frame information by 90 degrees from the reference display posture as shown in FIG. 5 and then synthesizing it with the image information G will be described. When a width Wa of a horizontal frame side Fa and a width Wb of a vertical frame side Fb are to be converted, the variable frame information is subjected first to an operation for rotating it counterclockwise by 90 degrees about a rotation center C and then subjected to a converting operation for the frame-side width for: Wa→WEB and Wb→WA. This conversion is effected according to the above-described conversion rule. According to this conversion rule, the horizontal frame side Fa and the vertical frame side Fb are converted by a predetermined reducing ratio and enlarging ratio. With this, the width WA is set for the vertical frame side FA of the variable frame information of the vertical posture and the frame information T with the width WB being set for the vertical frame side FB is mapped in the frame layer LT. Thereafter, the superposing synthesis operation thereof with the image layer LG mapping the image information G is carried out.

The character string information includes a plurality of kinds of character information representing a plurality of kinds of character strings, font information for determining a type and size of the font, a display parameter for determining a display position of a leading character of the character string, a parameter for setting an inter-character distance of the character string, and data describing a conversion rule for describing the rule used for the conversion. And, this character string information is stored in a folder having index information for discriminating the character string frame information. Also, the conversion rule can be a file describing the conversion rule in the text format. Instead, this can include a conversion program for effecting the process according to the conversion rule. The thumbnail information includes two kinds of information, one adapted for the reference display posture and the other adapted for the vertical posture composition of the image information G.

Figure 6:
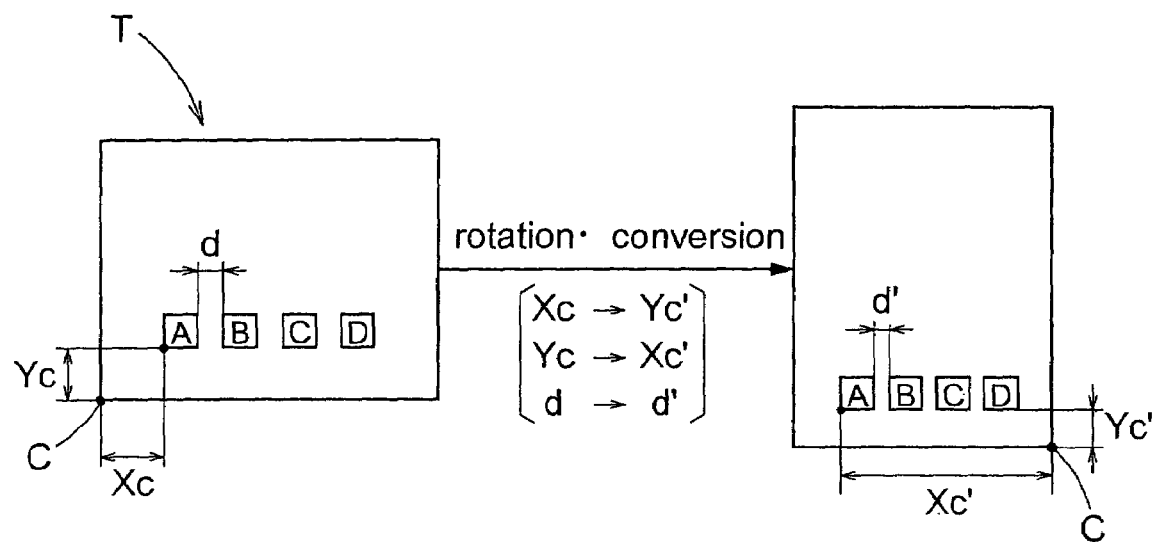
FIG. 6 is a schematic illustrating a converting operation of character string information relating to the first embodiment.

Next, an example of rotating this character string information counterclockwise by 90 degrees from the reference display posture shown in FIG. 6 about the rotation center C will be described. In the reference display posture, the character string is displayed with setting coordinates (Xc, Yc) relative to the rotation center C as a display start position and also setting the inter-character distance to d. For effecting the conversion, the conversion rule provides the conversion of Xc→Yc', Yc→Xc' and d→d' and also 90 degrees clockwise rotation conversion of each of the characters of the character string. With this, after the conversion, the character string will be displayed with (Xc', Yc') as the display start position and d' as the inter-character distance. Further, the rule includes parameters used when setting the inter-character distance d' for setting this distance d', based on a length of on side of the image data G corresponding to the direction along which the character string is to be disposed, the number of the characters and the font size.

The graphic information includes image data representing the graphic information, locate information for determining a display position of the graphic information and data for data describing a conversion rule for describing the rule used for the conversion. And, this graphic information is stored in a folder having index information for discriminating the graphic information. Also, the conversion rule can be a file describing the conversion rule in the text format. Instead, this can include a conversion program for effecting the process according to the conversion rule. The thumbnail information includes two kinds of information, one adapted for the reference display posture and the other adapted for the vertical posture composition of the image information G.

Figure 7:
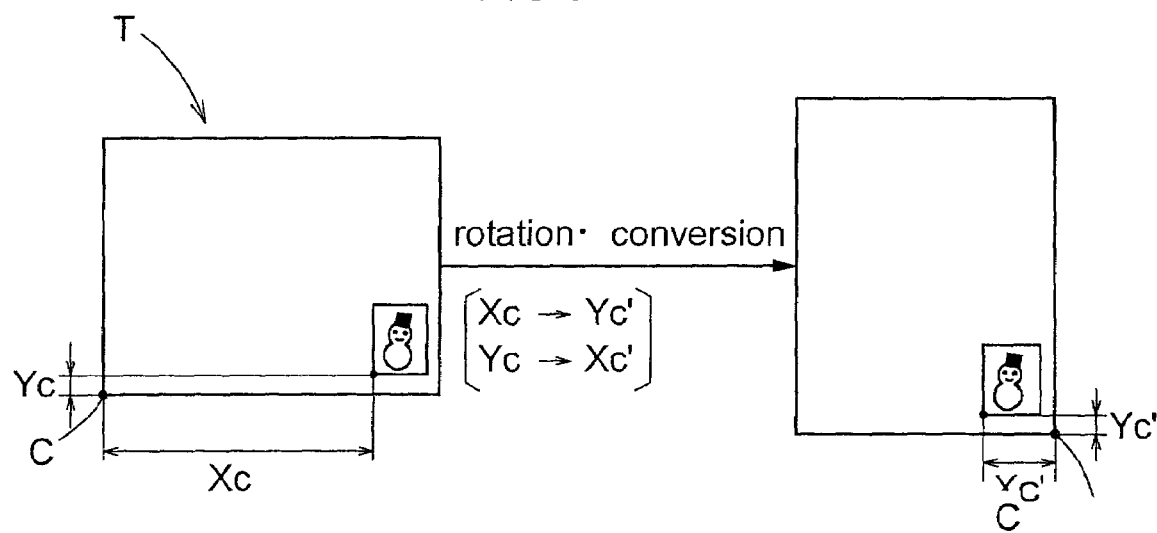
FIG. 7 is a schematic illustrating a converting operation of a graphic cartoon character information relating to the first embodiment.

Next, an example of rotating this graphic information counterclockwise by 90 degrees from the reference display posture shown in FIG. 7 about the rotation center C will be described. In the reference display posture, the graphic information is displayed with setting coordinates (Xc, Yc) (an example of the locate information) relative to the rotation center C as a display start position. For effecting the conversion, the conversion rule provides the conversion of Xc→Yc', Yc→Xc' and d→d' and also 90 degrees clockwise rotation conversion of the graphic information. With this, after the conversion, the graphic information will be displayed with (Xc', Yc') as the display start position. Further, the rule includes parameters used when converting the locate information for realizing the conversion, based on a print size and an aspect ratio of the image information G. Incidentally, in the above-described conversion process, the X-Y coordinate system data is used as the locate information. Instead, it is also possible to use vector data for determining the display position by way of a direction and a distance relative to a predetermined reference point.

Figure 8:
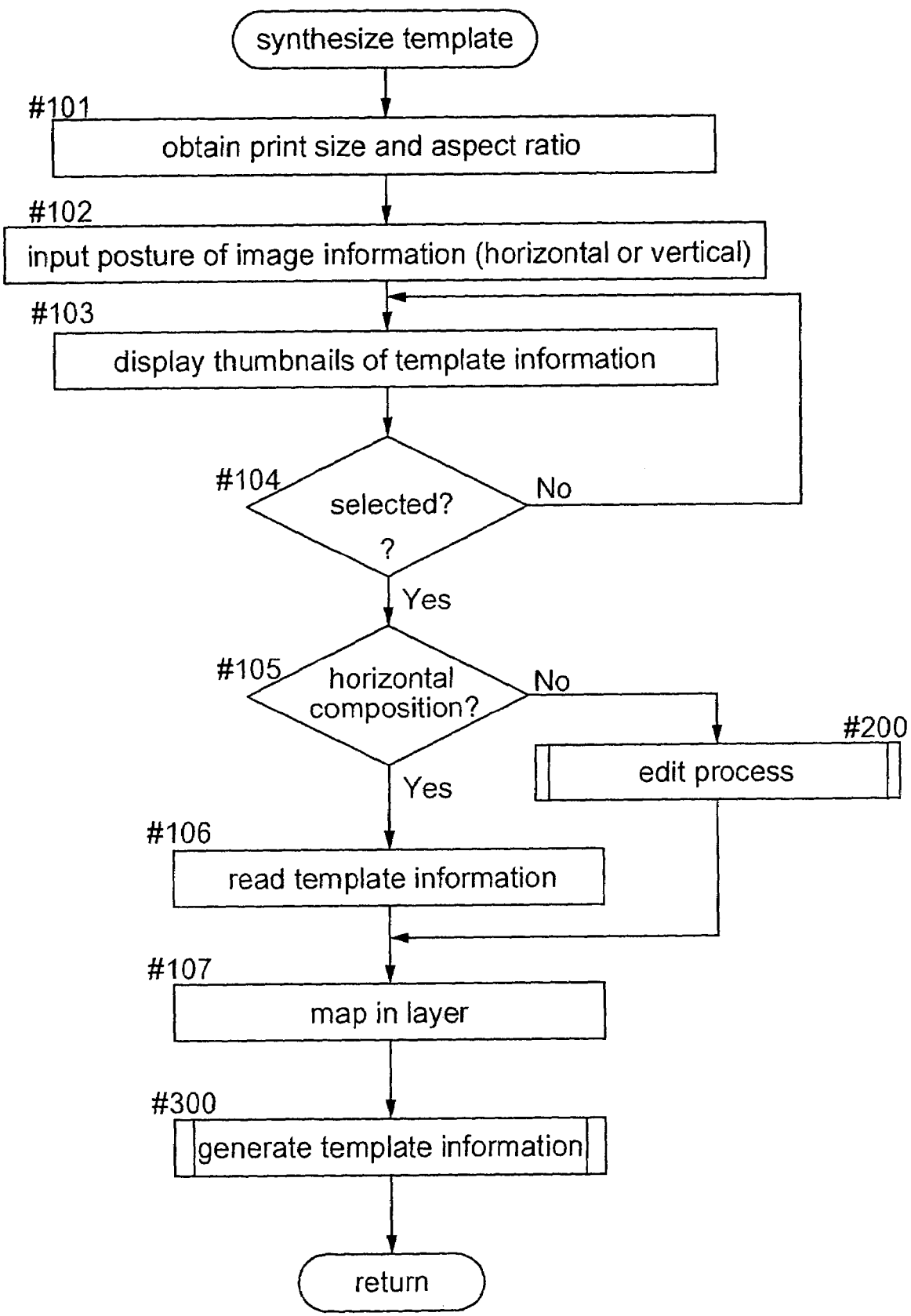
FIG. 8 is a flowchart illustrating a processing routine for synthesizing template information relating to the first embodiment.

The process for synthesizing the variable frame data of the above-described template information with the image information G can be illustrated generally by the schematic of FIG. 5 and the flowchart of FIG. 8.

That is, when the template synthesizing process is selected as described above, a print size and an aspect ratio of that print size are obtained from the controller 1 and then, the composition of the image information G is obtained based on an operator's operation (steps #101, #102). Incidentally, this image information G is mapped in the predetermined image layer LG and displayed on the display 2 as the original image information G or the thumbnailed image information G, so that the operator can confirm the composition based on this display.

In particular, though not illustrated in the flowchart, in order to effect the synthesizing operation of the template information, this requires a process of storing the template information having its reference posture set to correspond to either the vertical posture or the horizontal posture of the image information having different vertical and horizontal dimensions into the hard disc HD.

Next, based on these kinds of information, a plurality of corresponding thumbnail information are shown on the display 2 and then if the operator makes a selection based on these displays (steps #103, #104), the presence/absence of the corresponding template information T (variable frame information) is determined. If the corresponding information is present (that is, if the composition of the image information G is the horizontal posture), the corresponding template information T is read from the hard disc HD (steps #105, #106). On the other hand if the corresponding template information T is absent (that is, if the composition of the image information is the vertical posture), then, new template information T is generated (template generating routine: step #200).

Next, the template information T thus obtained is mapped in the template layer LT, so that the image information G and the template information T are displayed in the superposed/synthesized condition on the display 2, for allowing subsequent edit operation (steps #107, step #300). Thereafter, this synthesized information is transmitted to the exposing section controller 17 for printing it on the print paper 2.

Referring now to the template generating routine (step #200), as shown in the flowchart of FIG. 9, a rotation operation is effected according to the composition of the image information G. In this, if the composition of the image information G is the vertical posture, the conversion operation for covering the frame side widths (horizontal frame side and vertical frame side) is carried out according to the conversion rule (step #201). Incidentally, in this conversion of the frame side width, this can be done either by reducing and enlarging portions of the image. Instead, the contour and the arrangement of the frame can be prepared in the form of data and the conversion operation may be carried out by conversion of the contour and/or arrangement data.

Next, if the variable frame information is linked with the character string information, according to the respective conversion rules, the rotation operation of the character string, the conversion operation for converting the display position and the further conversion operation for changing the inter-character distance are carried out (steps #202, #203). In this process, the rotation operation of the character string is effected by specifying a numerical value for the parameter for specifying the display posture, the conversion operation for converting the display position is effected by converting, according to the conversion rule, the numerical value for determining the position of the leading character of the character string, and the conversion operation for converting the inter-character distance is effected by converting, according to the conversion rule, the numerical value for determining the inter-character distance (see FIG. 6).

Next, if the variable frame information is linked with the graphic information, according to the respective conversion rules, the conversion operation of the graphic information and the conversion operation for converting the locate information for displaying the graphic information are carried out (steps #204, #205). In this process, the conversion operation for converting the locate information is effected by converting the coordinates for determining the display position according to the conversion rule (see FIG. 7).

The information thus synthesized is stored in the condition with the image layer LG mapping the image information G and the template layer LT mapping the template information being in the superposed/synthesized condition.

Figure 10:
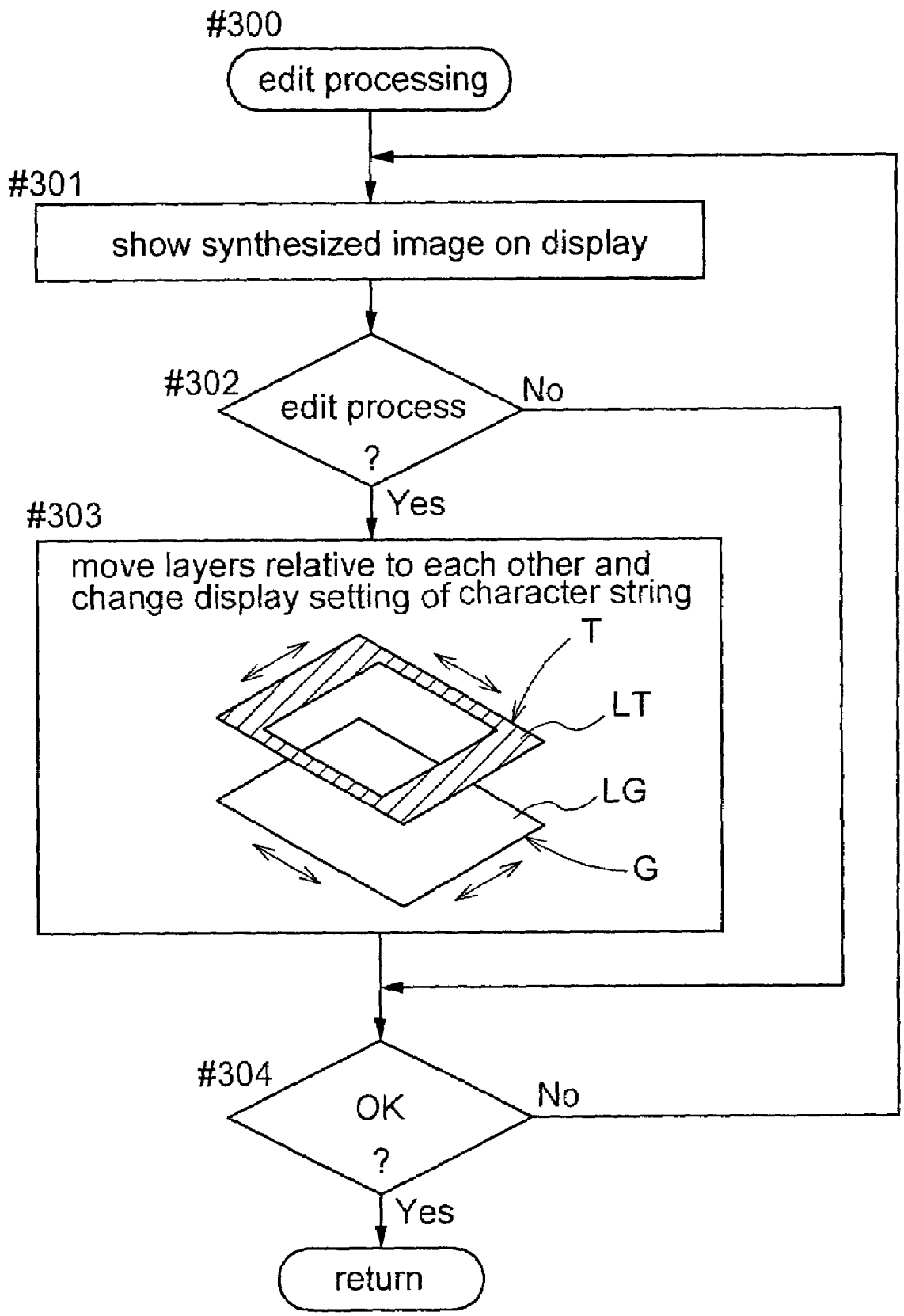
FIG. 10 is a flowchart illustrating a processing routine for editing relating to the first embodiment.

And, in the editing process (step #300), as shown in the flowchart of FIG. 10, the resultant image (synthesized information) including the image layer LG and the template layer LT superposed with each other is displayed on the display 2. Under this display condition, if the operator makes the selection for effecting an edit operation by operating the keyboard 3 or the mouse 4, the basic mode of operation is made possible for relative moving adjustment for moving the layers in the X-Y directions relative to each other (steps #301 through #303). Further, if necessary, operations for changing the font size, font type and/or the inter-character distance of the character string information and the synthesized image after effecting these operations are effected and shown on the display. If desired by the operator, the operator may operate an OK switch shown on the display 2 by means of a cursor or the like, so that the setting information after this edit process can be stored (step #304) and its printing operation is made possible. Incidentally, in the above edit process, if the operator determines that no edit process is needed, then, the initial condition may be stored with the operator's operation on the OK switch shown on the display 2 by means of a cursor or the like.

As described above, according to the present invention, of the plurality of kinds of template information T, the information with no distinction between the vertical posture and the horizontal posture is stored as the variable frame information (image data) for its reference display posture alone. And, the character string information as the template information t is stored as the character information and the display position information in the reference display posture. Further, the graphic information as yet another kind of template information T is stored as the graphic image data and the display position information in the reference display posture. With these, the synthesis operation is made possible, regardless of the composition of the image information G to be synthesized therewith. Especially, since the stored one kind of template information T can be synthesized with image information G of different compositions, there is no need for storing a plurality of kinds of template information for the vertical posture and the horizontal posture, respectively. Consequently, disadvantageous enlargement of the storage capacity required for e.g. the hard disc HD can be avoided and the cost of the entire apparatus can be reduced. Moreover, after the synthesis between the image information G and the template information T, the position adjustment of the image information G and the template information T is possible by the edit process. Thus, necessary adjustment can be done easily and conveniently.

Alternatively, according to the present invention, e.g. as the variable frame data, data representing contours of the horizontal frame side and the vertical frame side in the reference display posture may be stored. And, this variable frame data may be constructed so that a predetermined image may be fitted within an area delimited by the contour. And, when the movable frame information is to be rotated, the contour data may be converted for converting the widths of the horizontal and vertical frame sides.

Further, the invention may be used for a process involving only the character string information or the graphic information as the template information.

Second Embodiment

This second embodiment does not basically differ from the foregoing first embodiment in that a photographic printing system including a system body and a scanner unit is used for synthesis of image information and template information and subsequent printing of the resultant synthesized information (in the following discussion, the same components having the same functions as those of the first embodiment are denoted with the same reference numerals or marks).

Figure 11:
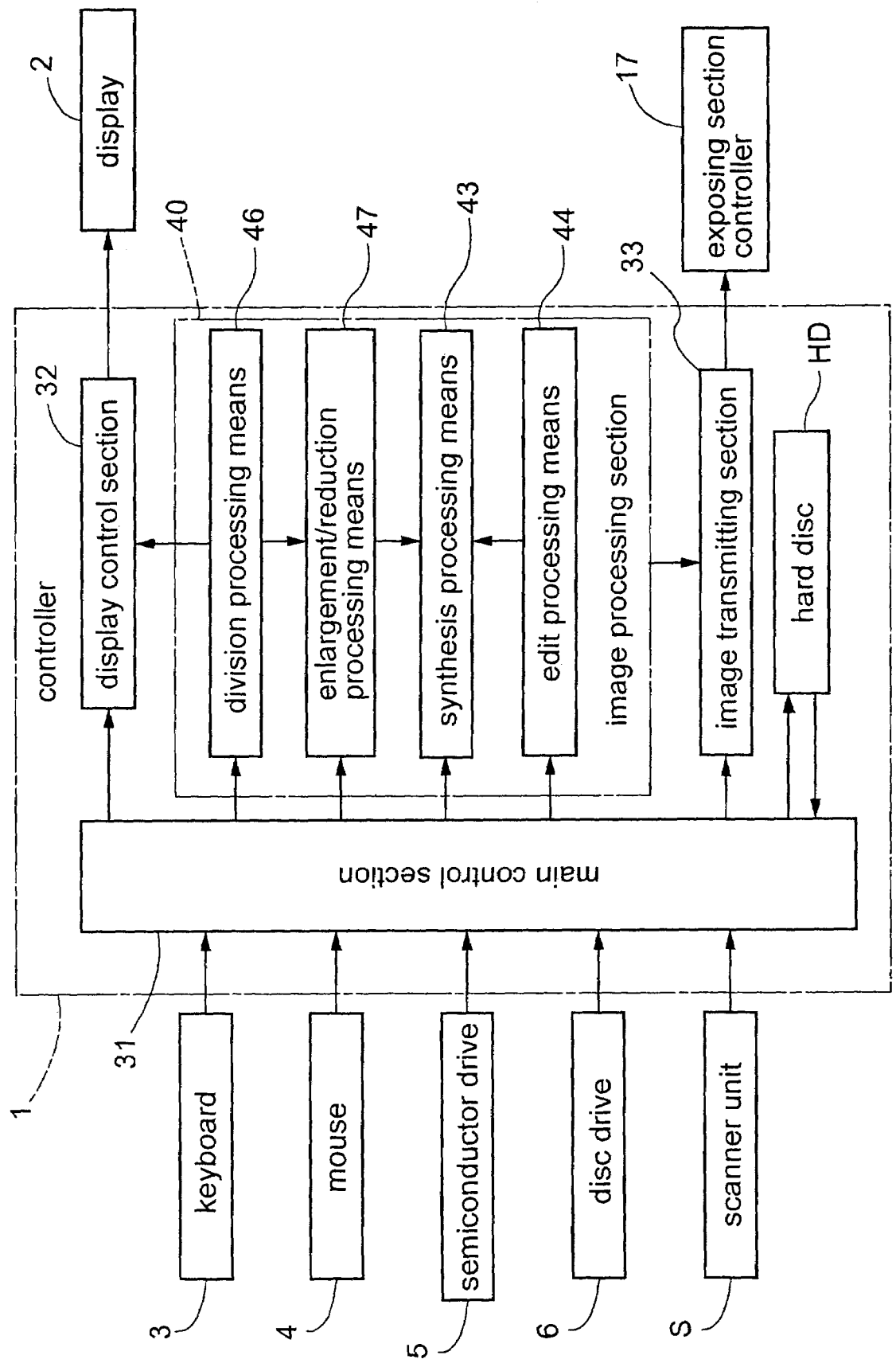
FIG. 11 is a circuit block diagram of a control unit relating to a second embodiment.

As shown in FIG. 11, the controller 1 includes a main control section 31 having a microprocessor, a semiconductor memory, an I/O interface, etc. and including an input system for inputting the signals from the keyboard 3, the mouse 4, the semiconductor drives 5, the disc drives 6 and the scanner unit S, a display control section 32 for outputting the image information G to the display 2, an image processing section 40 for effecting a correction operation of the image information G to be printed and a synthesizing operation of the image information G with template information T, an image transmitting section 33 for transmitting the image information G to be printed to the exposing section controller 17, and a hard disc HD as a storage device for storing information. In this hard disc HD, there are installed a basic OS (operating system) for realizing access to information and processing of the image information G and a software for realizing a printing operation and a synthesizing operation to be described later.

Figure 15:
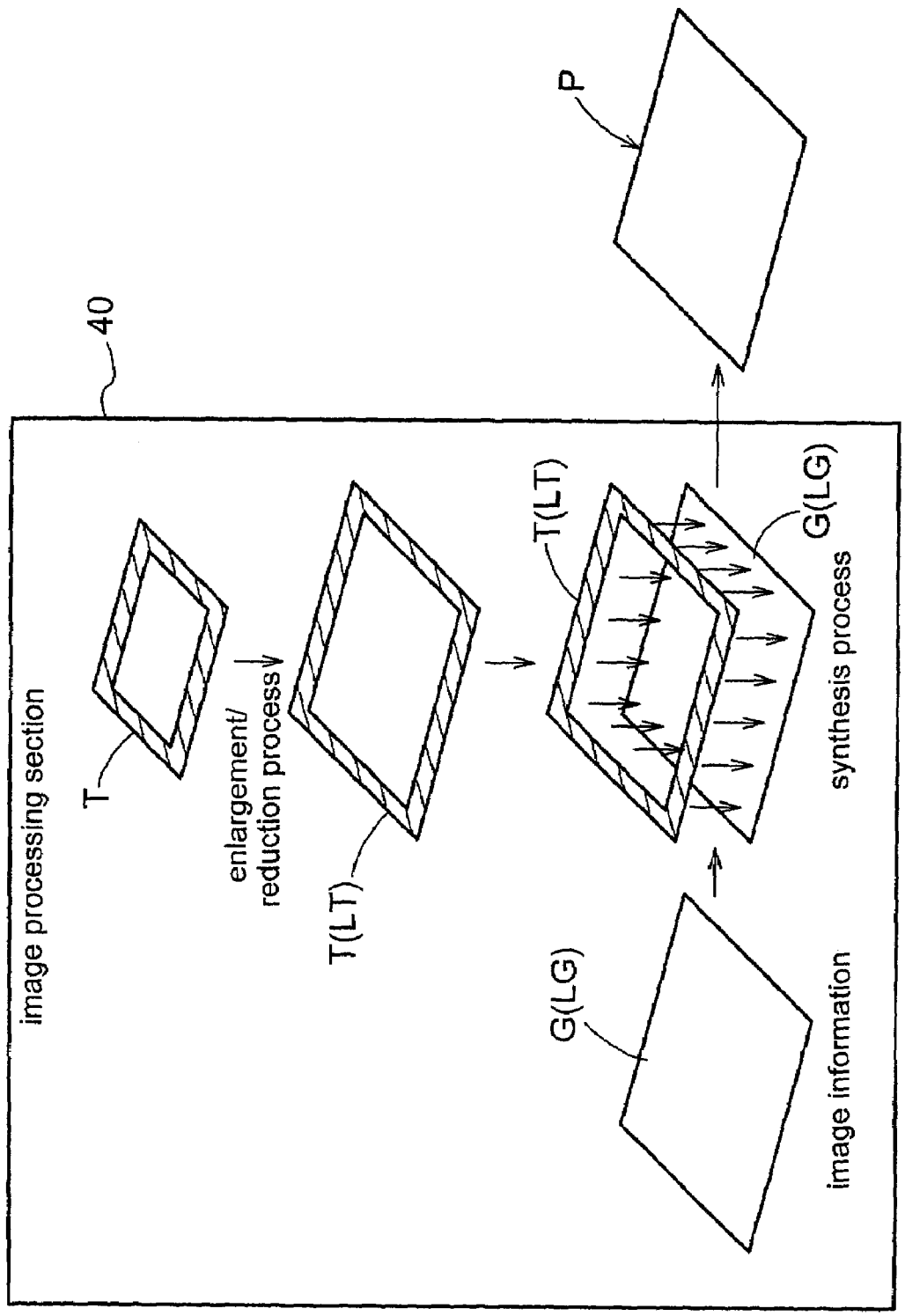
FIG. 15 is a block diagram showing an image processing system relating to the second embodiment.

As also shown in FIG. 11, the image processing section 40 includes division processing means 46 for effecting a dividing operation of the template information T, an enlargement/reduction processing means 47 for enlarging or reducing the template information according to a rule, a synthesis processing means 43 for effecting a synthesizing operation of the image information G and the template information T and an edit processing means 44 for adjusting relative positional relationship between the image layer LG mapping the image information G therein as shown in FIG. 15 and the template layer LT mapping the template information T therein. Each and every one of these means, i.e. the division processing means 46, the enlargement/reduction processing means 47, the synthesis processing means 43, and the edit processing means 44 can be provided as a hardware or software or a combination of hardware and software.

Though not shown, the template information T stored in various kids of media such as a semiconductor memory or a disc can be obtained by the semiconductor drive 5 or the disc drive 6.

Figure 14:
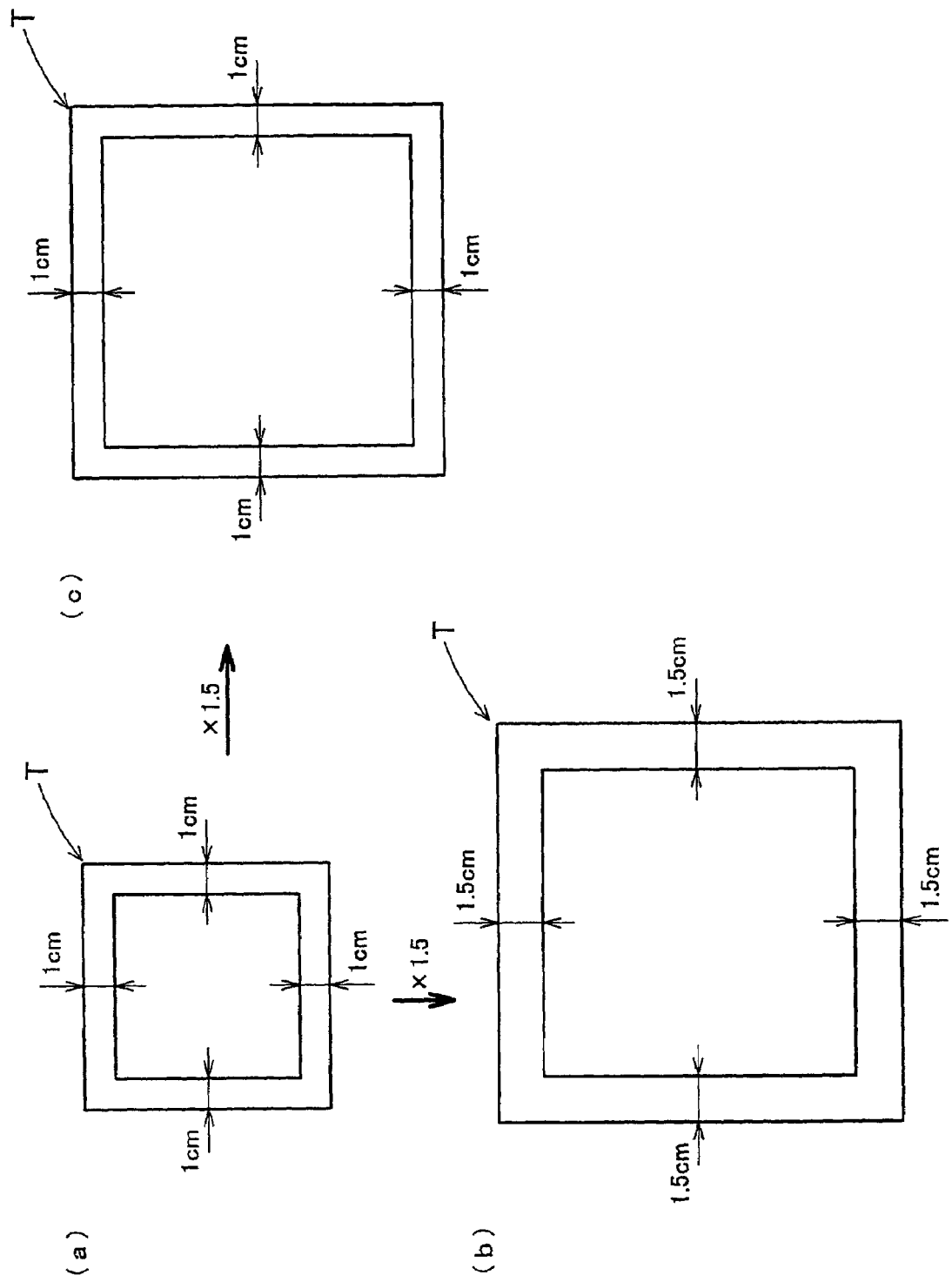
FIG. 14 shows images relating to the second embodiment including an original image, an enlarged image enlarged by the conventional method and an enlarged image enlarged by the invention's method.

According to the conventional art, as described hereinbefore, if template information T having a frame-side width of 1 cm shown in FIG. 14(a) is subjected to a 1.5 times enlargement operation, the frame side width of the template information T is also changed, so that template information T having a frame side width of 1.5 cm as shown in FIG. 14(b) is obtained. On the other hand, according to this second embodiment of the present invention, if the template information of FIG. 14(a) having the frame side width of 1 cm is subjected to the enlargement process, this will not result in the change of the frame side width, so that the template information T as shown in FIG. 14(c) can be obtained.

The image processing section 40 is operable to synthesize the image information G sent from e.g. the scanner unit S and the template information T and outputting the resultant synthesized (ornamented) image to the display 2 and outputting this information also to the exposing section controller 17 for printing it on the print paper P. This image processing section 40 is characterized by its ability to effect an enlarging/reducing operation on the template information T according to the size of the image information G to be printed.

Figure 12:
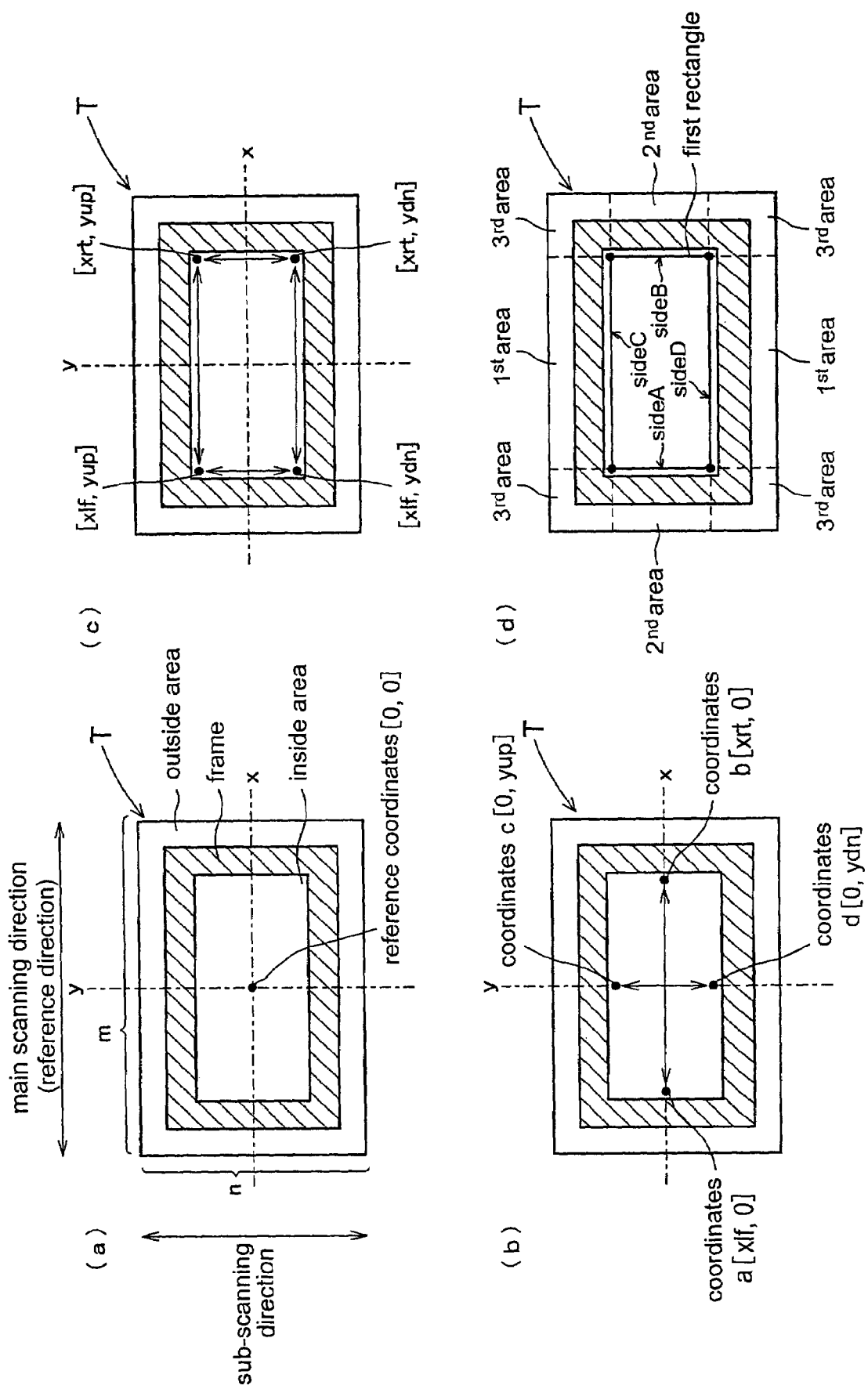
FIG. 12 illustrates processes relating to the second embodiment including a step for determining a reference coordinates of the template information, a step for detecting border pixels of the template information, a step for forming extension lines from the border pixels, and a step for forming a rectangle within the template information, FIG. 13 sequentially illustrates a mode of process relating to the second embodiment wherein a first area, a second area and a third area are set and then an enlarging operation is effected.
Figure 13:
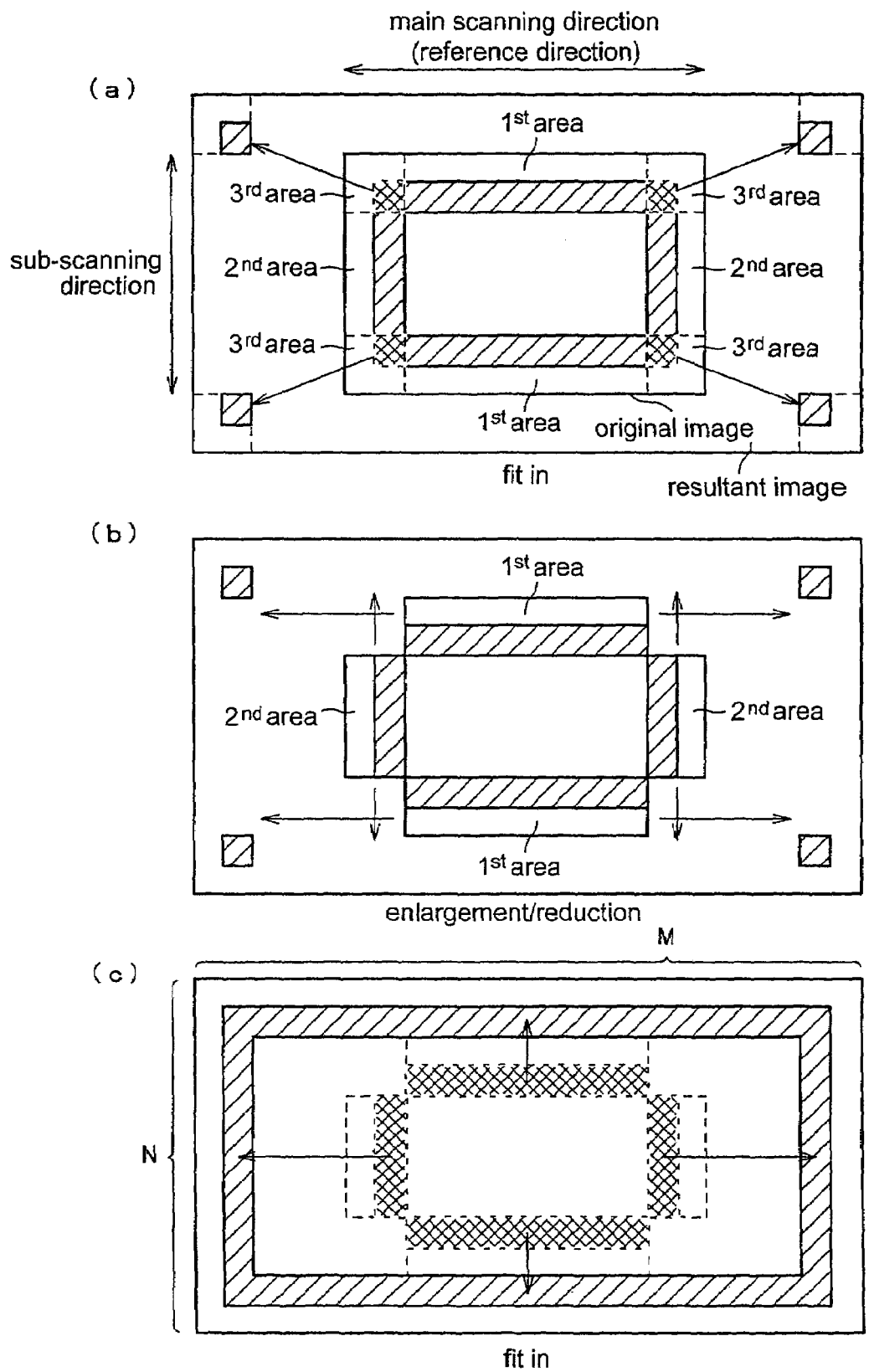
Figure 16:
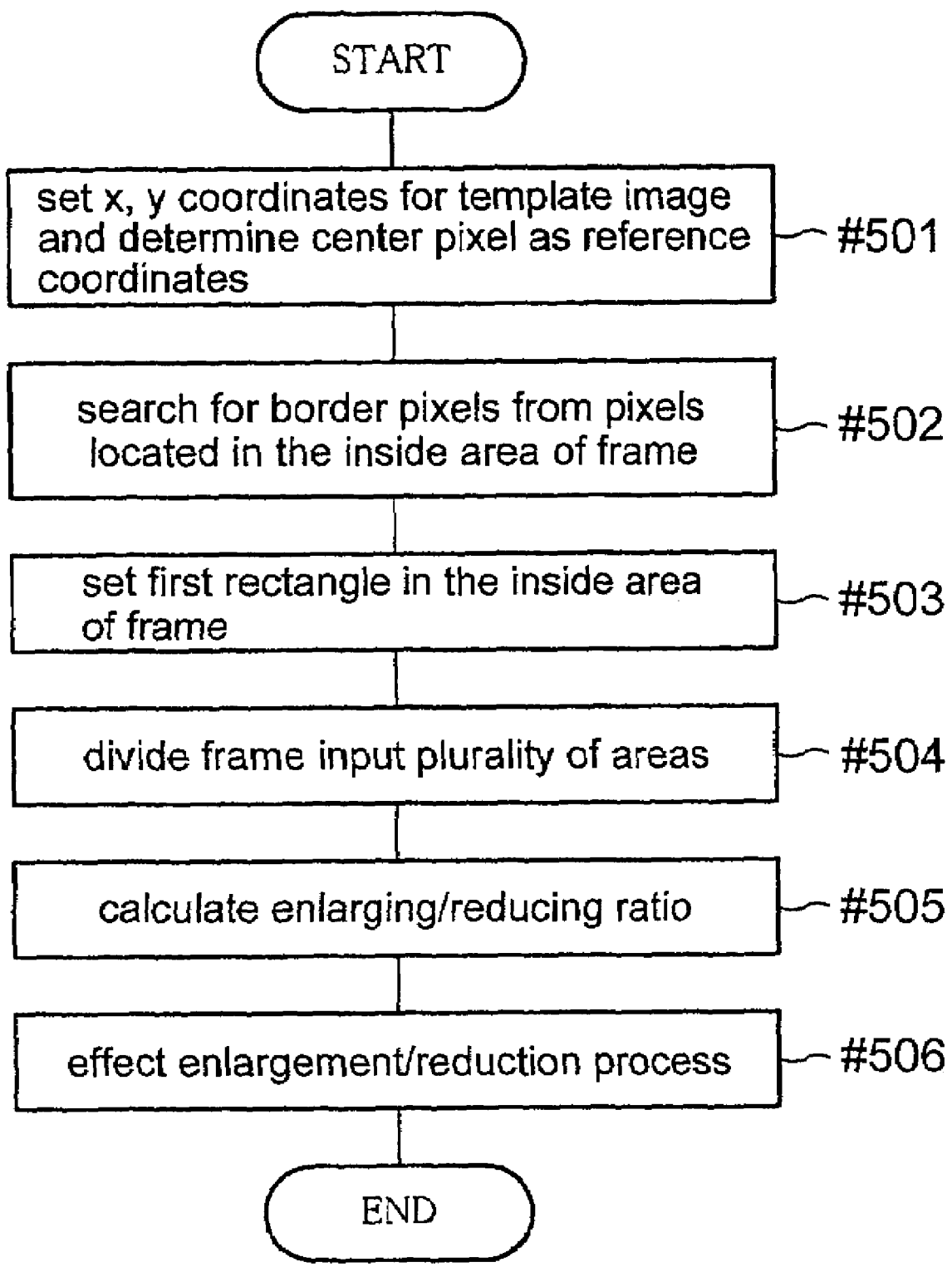
FIG. 16 is a flowchart illustrating the image processing method relating to the second embodiment.

Next, this enlarging/reducing operation effected by the image processing section 40 on the template information T will be described with reference to the flowchart of FIG. 16. The following discussion concerns an exemplary case in which template information consisting of m units of pixels in the frame side along the main scanning direction (reference direction) and n units of pixels in the frame side along the sub-scanning direction (i.e. m×n units of pixels) as shown in FIG. 12(a) is enlarged to template information T consisting of M×N units of pixels as shown in FIG. 13(c). Here, the main scanning direction refers to the direction normal to the transporting direction of the print paper P when the template information T is outputted to the print paper P. And, the enlarging/reducing operation is effected in the same manner for the data of the respective color components together constituting the template information T.

First, for the template information T, the image processing section 40 sets x, y coordinates and sets also the center pixel as the reference coordinates (step #501). In the process, the x axis is set to be parallel to the main scanning direction (reference direction or direction normal to the reference direction) and the y axis is set to be parallel to the sub-scanning direction (direction normal to the reference direction or the reference direction). Also, the pixel located at the m/2 th position from the terminal end of the image along the x axis and at the n/2 th position from the terminal end of the image along the y axis direction corresponds to the center axis. Therefore, this pixel is set as the "reference coordinates". Incidentally, in FIG. 12, the reference coordinates is set as [0, 0]. Further, this template information T, as shown in FIG. 12(a) consists of a rectangular frame, an area inside the frame and an area outside the frame. Incidentally, the reference coordinates does not necessarily comprise the center pixel of the template information T. Any pixel which is located in the area within the frame can be the reference pixel or coordinates.

Further, in this second embodiment, as described above, the reference coordinates is caused to agree with the origin [0, 0] of the coordinate system. But, this is also not absolutely needed. That is, the center of the image can be set as the reference coordinates and a point located at a left upper portion of the mage may be set as the origin [0, 0] of the coordinate system.

Next, the image processing section 40 searches for pixels inscribed to the frames (referred to as "border pixels" hereinafter) from those pixels located in the area inside the frame (step #502). In this process, first, as shown in FIG. 12(b), the image processing section 40 searches for the pixels from the reference coordinates along the x axis direction and the y axis direction (4 (four) directions in total). In this particular case, the pixels located in the area within the frame are completely white (in the case of 8-bit data, 255 gradations are provided for each of R, G, B). Therefore, the image processing section 40 continues the search for the pixels from the reference coordinates along the x axis direction and the y axis direction and eventually detects pixels having the gradation of any color components of R, G, B being not the maximum gradation (255 gradations in the case of 8-bit representation), so that those pixels overlapped with the frame can be identified.

After the above detection of the pixels overlapped with the frame, the image processing section 40 specifies pixels each displaced by one pixel amount toward the reference coordinates. And, these specified pixels are used as the "border pixels". As described hereinbefore, since the pixel search operation is effected from the reference pixel along the x axis direction and the y axis direction (four directions in total), four pixels are specified as the border pixels. Incidentally, the image processing section 40 can recognize the coordinates of each pixel by counting the number of pixels during the above-described search. In this second embodiment, the coordinates a [xlf, 0} and coordinates b [xrt, 0] are specified as the border pixels located along the x axis direction and the coordinates c [0, yup] and coordinates d [0, ydn] are specified as the border pixels located along the y axis.

Next, the image processing section 40 proceeds to set, within the frame, a "first rectangle" consisting of sides parallel to the x axis and further sides parallel to the y axis and inscribed to the frame (step #503). Next, this operation will be described in details. First, as shown in FIG. 12(c), by searching pixels from the coordinates a and the coordinates b along the y axis direction, extension lines are drawn and also by searching pixels from the coordinates c and the coordinates d along the x axis direction, further extension lines are drawn. Here, these extension lines drawn respectively from the coordinates a, b, c, d will be referred to as sides A, B, C, D, respectively. Therefore, the sides A, B are parallel to the y axis direction and the sides C, D are parallel to the x axis direction.

On the other hand, the frame sides contacting the coordinates a and the coordinates b are parallel to the y axis direction and the frame sides contacting the coordinates c and the coordinates d are parallel to the x axis direction. Therefore, when the respective extension lines are connected to each other in the area within the frame, it is possible to form the above-described first rectangle inscribed to the frame and consisting of the sides A, B, C, D. And, the coordinates of the respective apices of the first rectangle are set as the left upper coordinates [xlf, yup], right upper coordinates [xrt, yup], left lower coordinates [xlf, ydn] and right lower coordinates [xrt, ydn], respectively.

Incidentally, in the above process relating to the second embodiment, the frame of the template information T is a rectangle consisting of the frame sides parallel to the x axis direction and the frame sides parallel to the y axis direction. Therefore, the first rectangle can be formed by the process of step #503. However, if the frame relating to the template information is of a non-rectangular shape, such as a circle, an oval or a non-rectangle polygon, a difference process to be described later in a further embodiment will be needed.

Next, the image processing section 40 divides the frame of the template information T into a plurality of areas (step #504). In this process, first, as shown in FIG. 12(d), extension lines (denoted with broken lines in the figure) are drawn from the respective sides of the first rectangle formed at step #503. And, the area surrounded by the sides C, D parallel to the x axis direction and the extension lines of the sides A, B is set as a first area. Also, the area surrounded by the sides A, B parallel with the y axis direction and the extension lines of the sides C, D is set as a second area. Further, the remaining area other than the first rectangle and the first and second areas is set as a third area.

Then, the image processing section 40 calculates an enlarging/reducing ratio to be used an enlarging/reducing operation to be described later (step #505). Incidentally, in this enlarging/reducing process, the coordinate position of original image (template information T prior to the enlargement/reduction) corresponding to the coordinates of each pixel of resultant image (template information T after the enlargement/reduction) predetermined by using the above-described enlarging/reducing ratio is obtained, and the pixel value of this coordinates position is obtained from this coordinate position by the linear interpolation process, so that this pixel values is used as the pixel value of the corresponding coordinates of the resultant image.

Further, in the enlargement/reduction process to be described later, for the first area, the enlargement/reduction operation is effected only in the x axis direction. For the second area, the operation is effected only in the y axis direction. And, no such operation at all is effected for the third area. Accordingly, the enlarging/reducing ratio is not simply a magnification ratio of the original image size relative to the resultant image size, but this ratio is calculated for each of the areas described above. Specifically, this enlarging/reducing ratio can be calculated by the following calculations.

First, as shown in FIG. 17(a), from the size (m×n pixels) of the original image and the coordinates of the respective apices of the first rectangle, the size of the third area in the x axis direction (xtmp) and the size thereof in the y axis direction (ytmp) are obtained by the following operation expressions.

$$xtmp=\{xlf+(m-xrt)\}/2$$

$$ytmp=\{ydn+(n-yup)\}/2$$

Incidentally, the size of the third area remains the same before and after the enlargement/reduction operation, since this area is not subjected to the enlargement/reduction operation.

Further, since the resultant image has a size of M×N, as shown in FIG. 17(b), the size of the first area in the x axis direction is (m−2×xtmp) for the original image and (M−2×xtmp) for the image after the enlargement/reduction operation. The size of the first area in the y axis direction remains the same before and after the enlargement/reduction operation.

Likewise, as shown in FIG. 17(xc), the size of the second area in the y axis direction is (n−2×ytmp) for the original image and (N−2×yutmp) for the image after the enlargement/reduction process. The size of the second area in the x axis direction remains the same before and after the enlargement/reduction operation.

Therefore, the enlargement/reduction ratio (xrto) of the first area in the x axis direction and the enlargement/reduction ratio (yrto) of the second area in the y axis direction are:

$$xrto=(m-2\times xtmp)/(M-2\times xtmp)$$

$$yrto=(n-2\times ytmp)/(N-2\times ytmp)$$

The enlargement/reduction ratios obtained above are the ratios of the size of the original image relative to that of the resultant image for the respective enlarged/reduced area. Therefore, the value of this enlargement/reduction ratio is below 1 (excluding "1" per se) in the case of enlargement and is above 1 in the case of the reduction.

Next, the image processing section 40 effects the enlargement/reduction operation for each of the divided area, according to the above-described enlargement/reduction ratio (step #506). The reason why the enlargement/reduction operation is effected for each divided area is that the enlargement/reduction operation is done only in the x axis direction for the first area, it is done only in the y axis direction for the second area and it is not done at all for the third area.

First, as shown in FIG. 13(a), the four third areas of the original image with their present size are fitted in the corresponding positions (corners) of the resultant image. With this, the operation for the third area is completed.

Then, as shown in FIG. 13(b), the enlargement/reduction operation is done respectively for the first area and the second area. In this enlargement/reduction process, from each coordinates belonging in the first area and the second area, the coordinates position of the original image is obtained. And, from this coordinate position, the pixel value of this coordinate position is obtained by the linear interpolation method, and this pixel value is used as the pixel value of the corresponding coordinates of the resultant image. Specifically, in effecting this process, each coordinates of each frame segment of the first and second areas of the resultant image is obtained as follows.

first area:
   each x coordinate of each frame segment=0~±(M−2× xtmp)/2
   each y coordinate of each frame segment=each y coordinate of original image second area:
   each x coordinate of each frame segment=each x coordinate of original image
   each y coordinate of each frame segment=0~±(M−2× ytmp)/2

And, the coordinate position of the original image corresponding to each coordinates of the resultant image obtained above can be obtained by the following mathematical operations.

first area:
   coordinate position of each x coordinate={0~±(M−2× xtmp)/2}×xrto
   coordinate position of each y coordinate=each y coordinate of resultant image second area:
   coordinate position of each x coordinate=each x coordinate of resultant image
   coordinate position of each y={0~±(M−2×ytmp)/2}× yrto Further, the pixel values of each of the coordinate positions above is obtained by the linear interpolation method. This linear interpolation method refers to a process in which if the number of the obtained coordinate positions is small, from the pixel value of the coordinates obtained by rounding off upward a fractional unit and a pixel value obtained by rounding off downward the fractional unit, the pixel values of the coordinate position are obtained. For instance, suppose [5.3, 2.0] is obtained as a certain coordinate position in the original image and a coordinate [5.0, 2.0] has a pixel value: e and coordinates [6.0, 2.0] has a pixel value: f. Then, the pixel value of [5.3, 2.0] is obtained as:

e×0.7+f×0.3.

After the pixel values of each coordinate position in the original image is obtained by the above calculation, by using these pixel values as the pixel values of the respective corresponding coordinates of the resultant image, the size of each frame segment can be enlarged/reduced. The reason why from the each coordinates of the resultant image, the coordinate position of the original image corresponding to the coordinates is obtained is that it is necessary to cause each coordinate of the resultant image to have an integer value since the image consists of pixels. Next, the image processing section 40, as shown in FIG. 13(c), fits the first area and the second area after the enlargement/reduction into the corresponding positions in the resultant image. With this, the operations for the first area and the second area are also completed.

Figure 27:
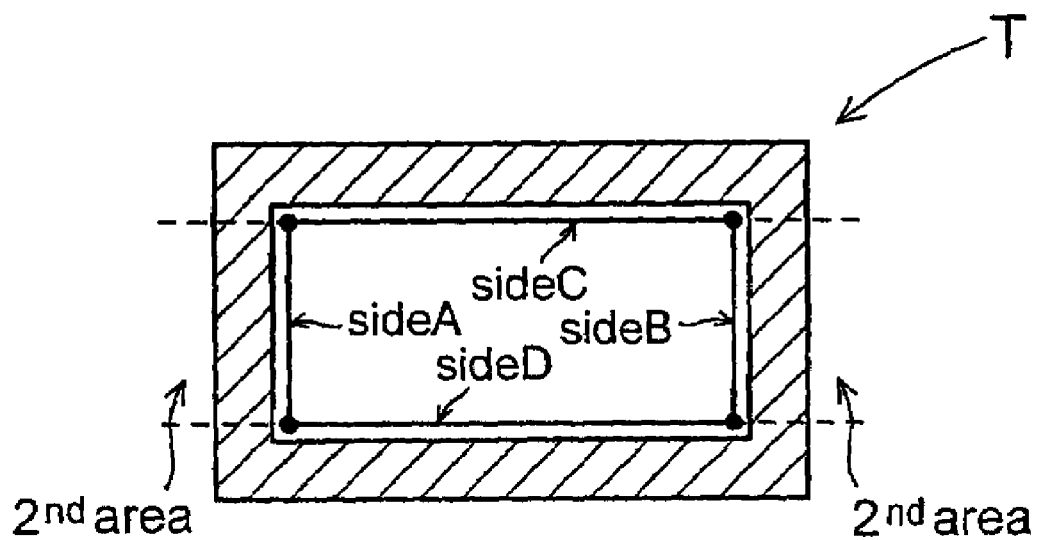
FIG. 27 is an explanatory view illustrating a condition when only the second area is set in the template image of FIG. 1.

With the execution of the above-described process, the template information shown in FIG. 12(a) can be "enlarged" to template information shown in FIG. 13(c). Further, in the case of the above-described process, the enlargement/reduction operation is effected for both the first area and the second area. Instead, this enlargement/reduction operation may be effected only for ether the first area or the second area. In this case, at step #504, only one of the first or second area may be set. Specifically, as shown in FIG. 27, for instance, by forming the extension lines from only the sides C and D in the template information T, the second area alone may be set and on this area the enlargement/reduction operation may be effected.

With the above, for instance, if it is desired to enlarge the template information of FIG. 18(a) in the main scanning direction, according to the conventional process, the template information of FIG. 18(b) is obtained. Whereas, if the enlargement/reduction process is effected only for the first area according to the process of this embodiment, the template information shown in FIG. 18(c) can be obtained. That is to say, in the case of the convention, if the template information is enlarged/reduced only in one direction (i.e. the case of changing the aspect ratio), this would result in associated change in the ratio of the vertical and horizontal frame side widths. With the method of the present embodiment, however, the aspect ratio of the template information can be changed with maintaining the frame side width constant.

Further, the method of setting the first rectangle is not limited to the one illustrated by steps #501 through #503. Alternatively, any other method can be employed if the first rectangle is set within the frame and this rectangle consists of sides parallel to the main scanning direction and sides parallel to the sub-scanning direction and any one side constituting the frame is parallel or substantially parallel with any one side constituting the first rectangle.

Moreover, in the case of the above-described process, the first rectangle is inscribed to the frame of the template information, that is, this rectangle is formed to have the maximum possible area. With this, the first area and the second area can contain maximum amount of frame segments subjected to the enlargement/reduction operations. However, the invention is not limited to this process. Namely, the first rectangle need not be inscribed to the frame as long as the first rectangle is set within the frame and this rectangle consists of sides parallel to the main scanning direction and sides parallel to the sub-scanning direction and any one side constituting the frame is parallel or substantially parallel with any one side constituting the first rectangle.

Variation 1 of Second Embodiment

Next, one variation embodiment of the invention will be described. Incidentally, the enlargement/reduction process relating to this Variation 1 differs from that of the foregoing second embodiment only in the shape of the frame relating to the template information and the process at step #503, the other processes being the same. Therefore, the following discussion mainly concerns the process for setting the first rectangular in the area within the frame relating to the template information T.

Figure 19:
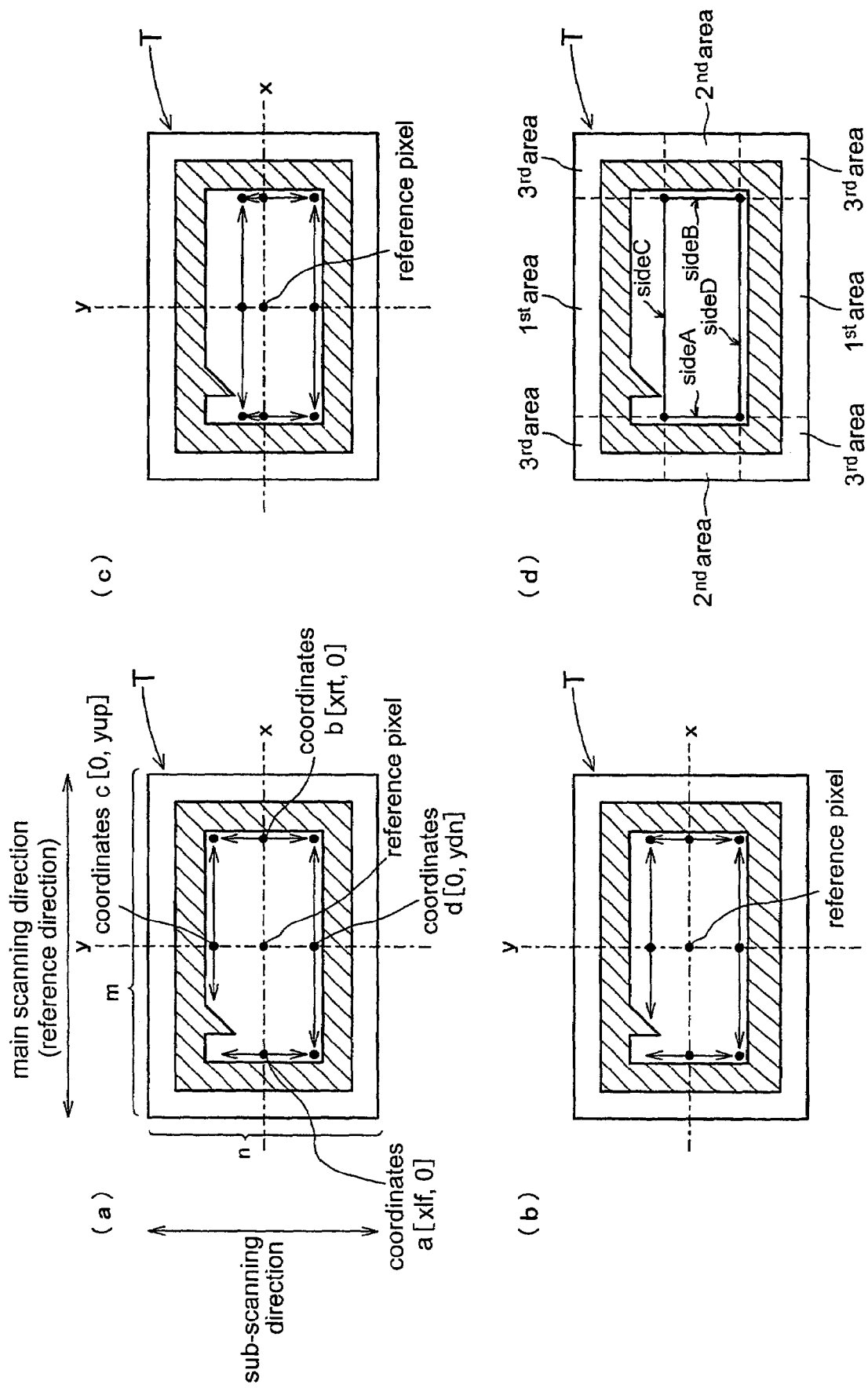
FIG. 19 illustrates processes relating to Variation 1 of the second embodiment including a step for determining a reference coordinates of the template information, a step for detecting border pixels of the template information, a step for forming extension lines from the border pixels, and a step for forming a rectangle within the template information, FIG. 20 sequentially illustrates a mode of process relating to the Variation 1 of the second embodiment wherein a first area, a second area and a third area are set and then an enlarging operation is effected.
Figure 21:
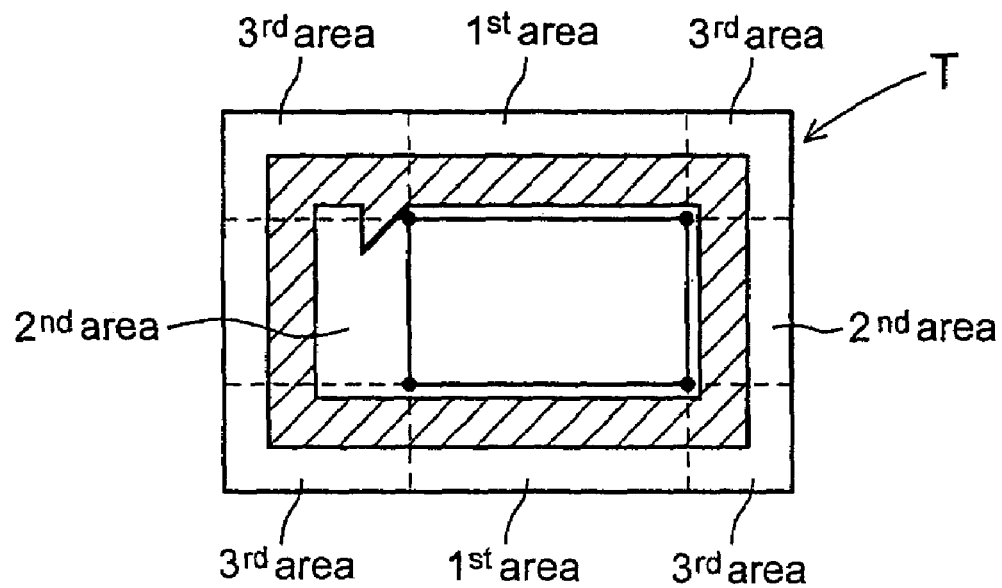
FIG. 21 is an explanatory view relating to the Variation 1 of the second embodiment illustrating a case when a projection projecting from a frame segment to the inside of the frame is included in the second area.

The frame of the template information T in this variation, as shown in FIG. 19(a) is also a rectangular frame, but has a projection projecting inward. In such case, as shown in FIG. 21, depending on the setting position of the first rectangle, there occurs inconvenience that a certain frame side belongs in the first area and also the projection formed from that frame side belongs in the second area. With occurrence of such inconvenience, in association with enlargement/reduction of the frame side in the main scanning direction, enlargement/reduction of the projection formed from this frame side in the sub-scanning direction occurs. In order to avoid this inconvenience, this variation provides enlargement/reduction process described next.

Namely, the process for enlarging the template information (the number of pixels: m×n) to template information (the number of pixels: M×N) shown in FIG. 20(c).

First, as shown in FIG. 19(a), when the operations of step #501 and step #502 are effected on the template information T, border pixels of the coordinates a [xlf, 0], the coordinates b [xrt, 0], the coordinates c [0, yup] and the coordinates d [0, ydn] can be set.

Then, the image processing section 40 sets the first rectangle in the area within the frame. In this process, first, extension lines are drawn in the y axis direction from the coordinates a and the coordinates b and extension lines are drawn in the x axis direction from the coordinates c and the coordinates d, respectively. In this, the extension line drawn from the coordinates c in the negative side of the x axis comes into contact (detect) with the projection formed on the frame side before intersecting the extension line drawn from the coordinates a. Then, if the first rectangle is formed in this condition, the extension line comes into contact with the projection before intersecting the other extension line, the projection belongs in both the first area and the second area as described above.

In such case, as shown in FIG. 19(b), in order to avoid contact with the projection by displacing the extension line toward the reference pixel, the coordinates c is displaced by 1 pixel toward the reference pixel and then extension lines are again drawn respectively from the coordinates a, coordinates b, coordinates c and coordinates d. In this, the length of the extension line drawn from the coordinates a is caused to agree with the length of the extension line drawn from the coordinates b.

And, the above operation of displaying the coordinates c by one pixel toward the reference pixel is repeated until the extension line drawn from the coordinates c in the positive side of the x axis direction and intersects the extension line drawn from the coordinates a. With these, as shown in FIG. 19(c), it is possible to form the first rectangle consisting of the extension lines from the coordinates a, coordinates b, coordinates c and coordinates d. Here, these extension lines drawn from the respective coordinates a, b, c, d are referred to as sides A, B, C, D, respectively.

Next, the image processing section 40 effects the same process as step #504. That is, as shown in FIG. 19(d), the area surrounded by the sides C, D parallel with the x axis direction and the extension lines from the sides A, B is set as the first area, the area surrounded by the sides A, B parallel with the y axis direction and the extension lines from the sides C, D is set as the second area and the other area other than the firs rectangle and the other first and second areas is set as the third area.

Figure 20:
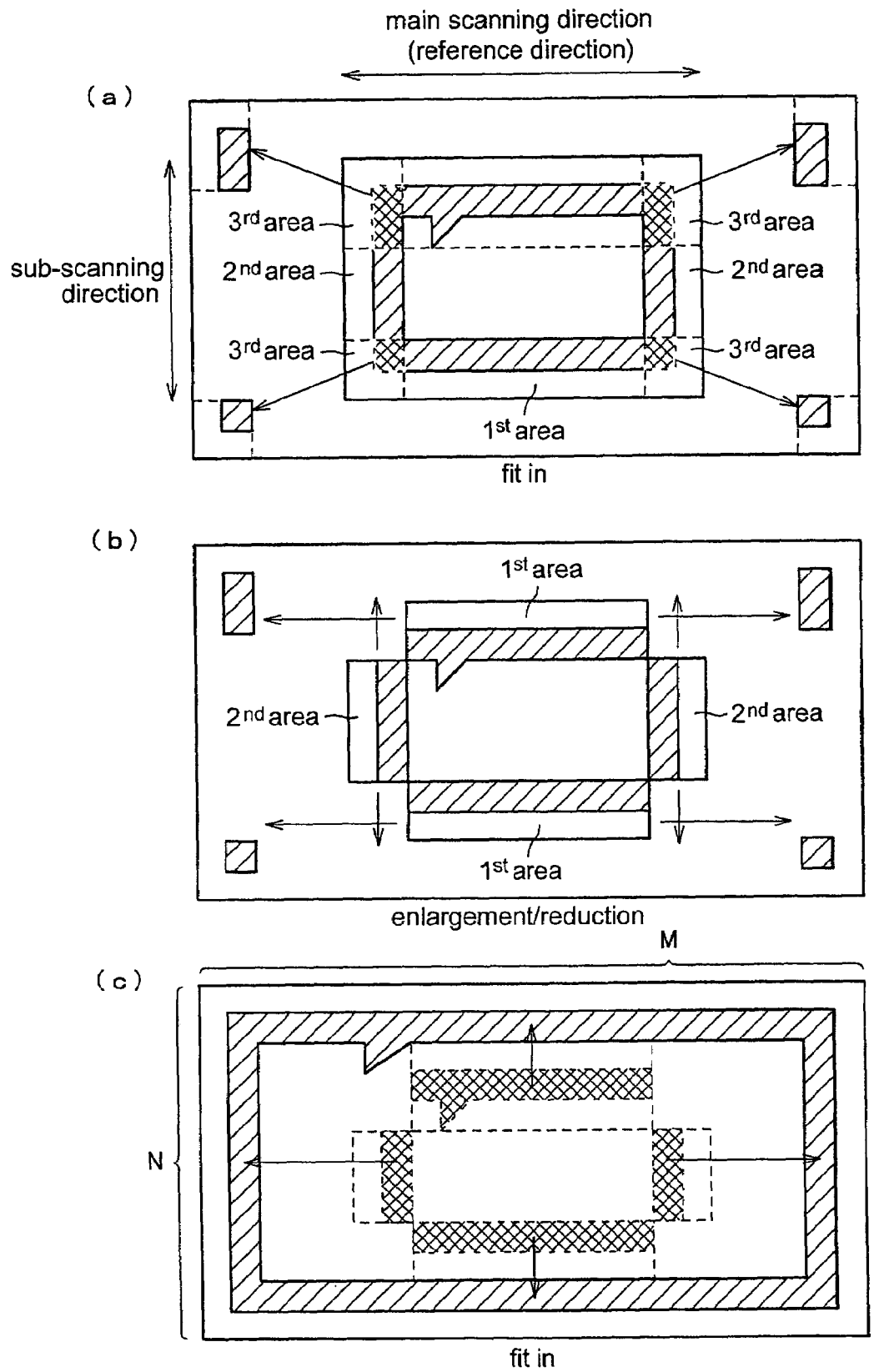

Further, after the image processing section 40 obtains the enlargement/reduction ratios by the same process as step #505, the section effects the enlargement/reduction operations by the same process as step #506. First, as shown in FIG. 20(a), the four third areas of the original image with their present size are fitted in the corresponding positions (corners) of the resultant image. With this, the operation for the third area is completed.

Then, as shown in FIG. 20(b), the enlargement/reduction operation is done respectively for the first area and the second area. Thereafter, as shown in FIG. 20(c), the first area and the second area after the enlargement/reduction are fitted into the corresponding positions in the resultant image. With this, the operations for the first area and the second area are also completed.

For instance, if it is desired to enlarge the template information of FIG. 23(a) in the x axis scanning direction, according to the conventional process, the template information of FIG. 23(b) is obtained. Whereas, with the process of this embodiment, the template information shown in FIG. 23(c) can be obtained.

By carrying out the above process, even if a projection is formed on a frame side, the frame sides parallel with the main scanning direction can be completely included in the first area and the sides parallel with the sub-scanning direction can be completely included in the second area.

Figure 22:
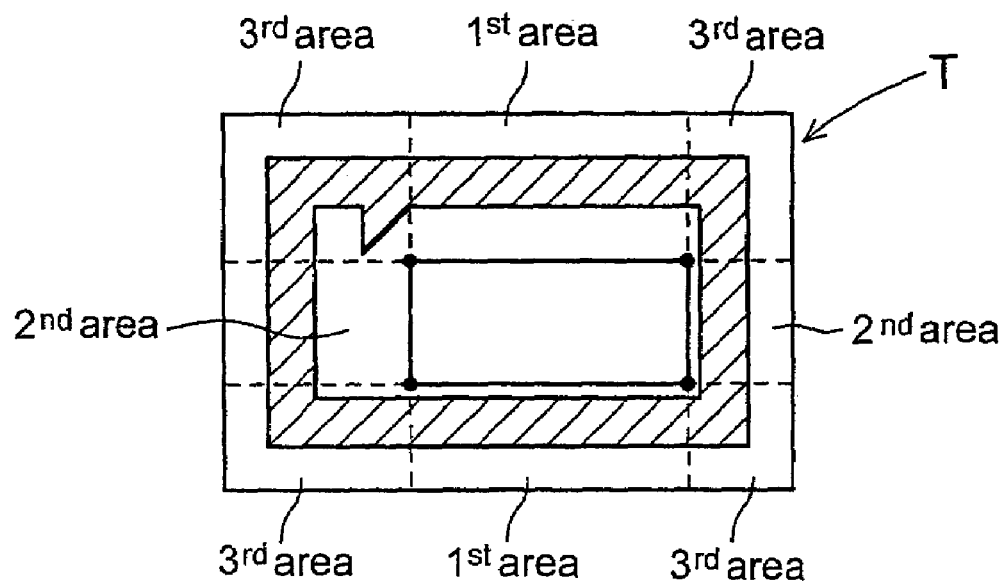
FIG. 22 is an explanatory view relating to the Variation 1 of the second embodiment illustrating a case when a projection projecting from a frame segment to the inside of the frame is included in the third area.

Further, as shown in FIG. 22, the first rectangle may be set so that the portion of the projection is included in the third area. In this case, the enlargement/reduction process can be effected on the template information with maintaining the projection at the present magnification.

That is to say, the method of setting the first rectangle is not limited to the above as long as the frame sides parallel or substantially parallel with the main scanning direction belong in the areas other than the second area and the frame sides parallel or substantially parallel with the sub-scanning direction belong in the areas other than the first area.

Further, the foregoing embodiments (first and second embodiments) concern the template information T in the form of a rectangular frame. However, this frame need not be strictly rectangular. The processes of the foregoing first and second embodiments may be applied to an approximate rectangle having substantially straight sides. For instance, the processes of the foregoing first and second embodiments can be applied to template information T shown in FIG. 23(a) having a substantially rectangle shape.

Variation 2 of Second Embodiment

Next, still another variation embodiment of the invention will be described. Incidentally, the enlargement/reduction process relating to this Variation 2 differs from that of the second embodiment only in the shape of the frame relating to the template information and the process at step #503, the other processes being the same. Incidentally, the rectangle (first rectangle in the foregoing embodiment) to be set within the frame in Variation 1 is now replaced by a second rectangle which differs from the first rectangle. Therefore, the following discussion mainly concerns the process for setting the first rectangular in the area within the frame relating to the template information T.

In this Variation 2, there will be described a process for enlargement to template information T (the number of pixels: m×n) relating to a hexagonal frame shown in FIG. 24(a).

Figure 24:
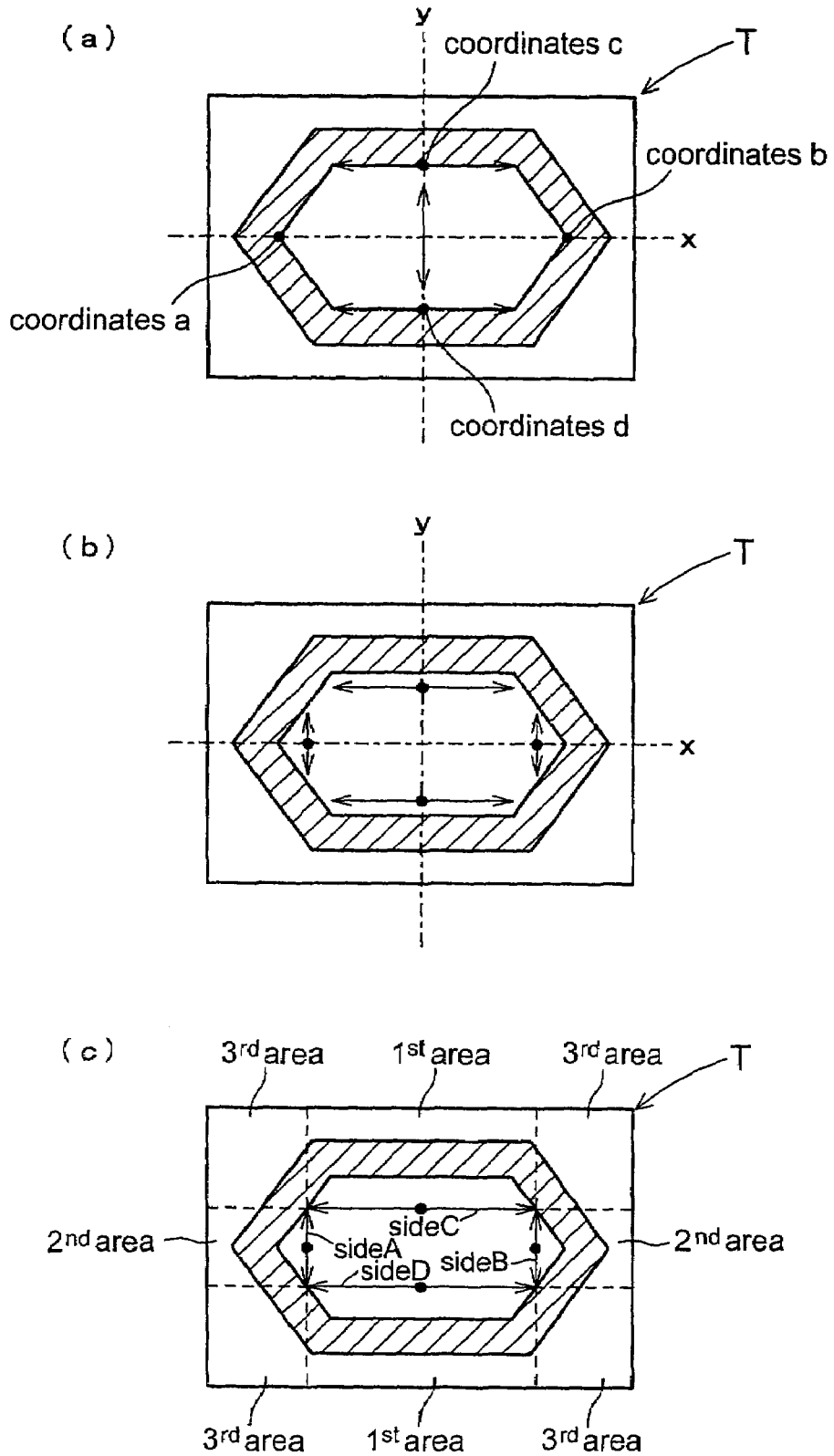

First, as shown in FIG. 24(a), when the operations of step #501 and step #502 are effected on the template information T, border pixels of the coordinates a, the coordinates b, the coordinates c and the coordinates d can be set.

Then, the image processing section 40 sets in the area within the frame the second rectangle consisting of the sides parallel to the x axis and the sides parallel to the y axis and having the respective apices thereof inscribed to the frame of the second rectangle with the length of the perpendicular line drawn from the midpoint to the frame being equal for the respective sides. Referring to this process in greater details, first, extension lines are drawn in the y axis direction from the coordinates a and the coordinates b and extension lines are drawn in the x axis direction from the coordinates c and the coordinates d, respectively. In this, the extension line drawn from the coordinates become overlapped (detect) with the frame. When the second rectangle is formed under this condition, a portion of the frame belongs in both the first area and the second area.

In such case, as shown in FIG. 24(b), each coordinates is displaced by 1 pixel toward the reference pixel and then extension lines are again drawn respectively for the coordinates a, coordinates b, coordinates c and coordinates d.

And, the above operation of displacing each coordinates by one pixel toward the reference pixel is repeated until the extension lines drawn from the coordinates intersect with each other. With these, as shown in FIG. 24(c), it is possible to form the second rectangle having the respective apices thereof inscribed to the template information T. Further, by effecting the similar step to step #504, the area surrounded by the sides C, D parallel with the x axis direction and the extension lines from the sides A, B is set as the first area, the area surrounded by the sides A, B parallel with the y axis direction and the extension lines from the sides C, D is set as the second area and the other area is set as the third area.

With the above, the distance between each frame side of the first area and the second area and that between the sides of the areas including the respective sides may be equal to each other. So that, the lengths of the frame sides belonging in the first and second areas may be adjusted in good balance with each other. Further, the frame side whose longitudinal direction is near the main scanning direction can be included in the first area and the frame side whose longitudinal direction is near the sub-scanning direction may be included in the second area and the other frame sides can be included in the third area.

Then, by effecting the enlargement/reduction process by the steps #505-507, even the template information T shown in FIG. 25(a) relating to the hexagonal frame can be enlarged/reduced with maintaining the frame side widths constant. In this, in the case of the conventional process, the template information shown in FIG. 25(b) would be obtained. Whereas, in the case of the process relating to the present embodiment, the template information shown in FIG. 25(c) can be obtained. With the frame relating to this template information, although the frame has some deformed portion, the frame is enlarged in the sub-scanning direction with substantially maintaining the frame side width as a whole.

Figure 26:
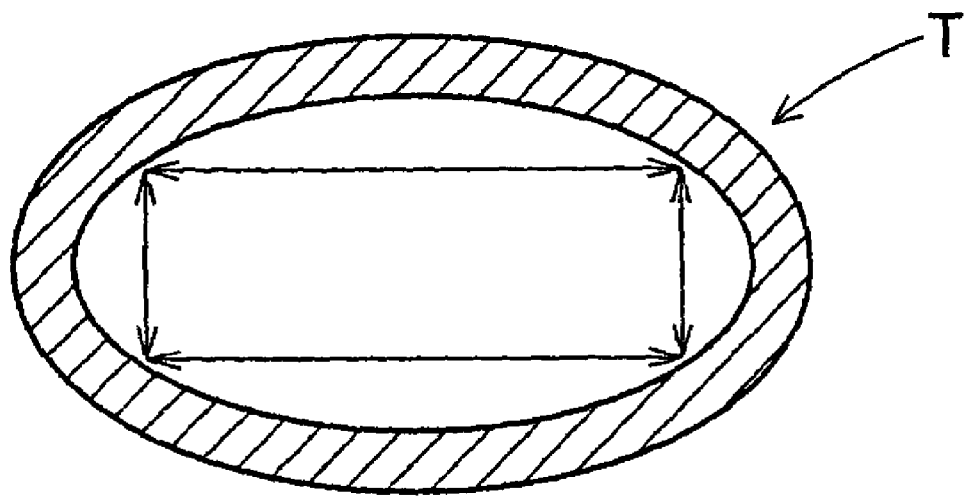
FIG. 26 is an explanatory view relating to the Variation 2 of the second embodiment illustrating a case when a rectangle is formed within an oval shaped template information.

Further, the foregoing embodiment relates to the hexagonal frame. The invention is not limited thereto. For instance, the mode of this embodiment can be applied to an oval frame as shown in FIG. 26.

Incidentally, in the foregoing second embodiment, Variation 1 and Variation 2, the descriptions concern the rectangular, hexagonal and oval frames. The invention is not limited thereto. The invention can be applied to template information of any frame-like shape.

Further, in the foregoing processes, the enlargement/reduction processes are effected by means of the coordinate transformation utilizing the linear interpolation method. The invention is not limited thereto, either.

Also, in the foregoing embodiments the means for dividing the frame of the template information T into a plurality of frame sides or segments comprises the step of dividing the template information T into the respective areas by the sides or the extension lines drawn therefrom of the first rectangle or the second rectangle. The invention is not limited to this construction. That is, if the area including the side whose longitudinal direction is near the main scanning direction is set as the first area, the side whose longitudinal direction is near the sub-scanning direction is set as the second area and the other area where no enlargement/reduction is effected is set as the third area, the dividing means is not limited to the above-described means using the first or second rectangle.

Further, the enlargement/reduction process employed by the invention may be a process involving the step of dividing the frame of the template information T into a plurality of frame sides and the step of effecting the enlargement/reduction in either the main scanning direction or sub-scanning direction on at least one frame side so that the direction of effecting the enlargement/reduction does not agree with the width direction of each frame side.

Also, according to the process of the present invention, it is possible to freely enlarge/reduce the template information T with maintaining its ornamental effect. Therefore, it will suffice to store only one image in the memory for template information of one ornamental design. Hence, it is possible to cut down on the memory capacity of the image processing section 40. Further, the template information T can be synthesized with the inputted image information according to various print sizes.

Incidentally, the procedure described in the second embodiment, Variation 1 and Variation 2 can be realized in the form of a computer program. And, this computer program will be stored in a computer-readable storage medium. In the case of the present invention, this storage medium can be an semiconductor memory (e.g. ROM per se) required for the process, but not illustrated as it is executed at the image processing section 40. Or, though not shown, it can be a program recording medium to be inserted into a program reader device as an external storage unit so that its program may be loaded into the device upon the insertion.

In any of the cases above, it is possible to adapt the stored program to be executable when accessed by a microprocessor (not shown). Or, it is also possible to adapt the program to be executed when this program is read from the medium and then this read program is downloaded to an unillustrated program storing area of the microprocessor. In this case, a program required for the downloading operation will be stored in advance in the main body of the device.

In the above, the program medium described above refers to a recording medium detachable to a main device body and this medium can fixedly storing the program therein, such as the tape type media as a magnetic tape or cassette tape, a disc type media such as magnetic discs including a floppy (registered trademark) disc, a hard disc, etc, as well as optical discs including CD-ROM, MO, MD, DVD, etc, the card type media such as IC card (including a memory card) or an optical card, or the semiconductor memory devices including a mask ROM, EPROM, EEPROM, flash ROM, etc.

Lastly, the present invention is not limited by the above-described embodiments, but can be subjected to various changes or modifications within the scope of the invention defined in the appended claims.

The invention claimed is:

1. An image processing apparatus having synthesizing means for synthesizing image information in the form of digital signals and template information, the apparatus comprising:

the template information having a reference display posture corresponding to either a vertical or horizontal posture of the image information, the vertical and horizontal postures having different vertical and horizontal sizes from each other;

rotation processing means for rotating the template information so as to cause said reference posture thereof to correspond to said either posture of the image information when said either posture of the image information differs from said reference display posture of the template information, thereby providing optimum template information for synthesizing the image information; and converting means for converting the template information according to a predetermined rule when said rotation processing means rotates the template information.

2. The image processing apparatus according to claim 1, wherein the template information comprises image data for forming, in said reference display posture, horizontal sides and vertical sides around the image information and said rule includes a numerical value representing a ratio for converting a width of the horizontal side of the template information prior to said rotation operation to a width of the vertical side of the template information after said rotation processing means rotates the template information and a numerical value representing a ratio for converting a width of the vertical side of the template information prior to said rotation processing means rotating the template information to the width of the horizontal side of the template information after said rotation processing means rotates the template information.

3. The image processing apparatus according to claim 1, wherein the template information comprises character string data for displaying a leading character according to a predetermined reference coordinate system in the reference display posture; and said rule includes a parameter for converting a display position of the leading character into a value corresponding to a length of one side of the image information after said rotation processing means rotates the template information and a parameter for setting an inter-character distance of the character string according to the length of said one side.

4. The image processing apparatus according to claim 1, wherein the template information comprise image data to be set within the image information based on predetermined locate information in the reference display posture; and said rule includes a parameter for converting the locate information so that the template information may be displayed at a predetermined position within the image information during rotation of the template information by said rotating processing means.

5. The image processing apparatus according to claim 2, further comprising an edit processing means including an image layer for storing the image information and a template layer for storing the converted template information, the edit processing means being capable of freely adjusting positional relationship between the image layer and the template layer.

6. An image processing method having the step of synthesizing image information in the form of digital signals and template information, the method comprising the steps of:
setting the template information to a reference display posture corresponding to either a vertical posture or a horizontal posture of the image information, the vertical and horizontal postures having different vertical and horizontal sizes from each other;
rotating the template information according to the posture of the image information so as to cause said reference display posture thereof to correspond to said either posture of the image information when said posture of the image information differs from said reference display posture of the template information, thereby providing optimum template information for synthesizing the image information; and
converting the template information according to a predetermined rule when said rotating step is effected, thereby providing.

\* \* \* \* \*